US009370275B2

(12) United States Patent
Jackson et al.

(10) Patent No.: US 9,370,275 B2
(45) Date of Patent: Jun. 21, 2016

(54) SANDWICH MAKING APPLIANCE AND METHOD OF MAKING A SANDWICH WITH THE SAME

(71) Applicant: Hamilton Beach Brands, Inc., Glen Allen, VA (US)

(72) Inventors: David L Jackson, Mechanicsville, VA (US); Michael Garman, Moseley, VA (US); Abraham S Longmire, Ashland, VA (US); George Stamper, Quinton, VA (US); Michael M. Pierce, Henrico, VA (US); Derek A. McCullough, Henrico, VA (US); Mark C Steiner, Midlothian, VA (US); Claire Ashley, New York, NY (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 268 days.

(21) Appl. No.: 14/186,812

(22) Filed: Feb. 21, 2014

(65) Prior Publication Data
US 2014/0217084 A1 Aug. 7, 2014

Related U.S. Application Data

(63) Continuation-in-part of application No. 13/740,594, filed on Jan. 14, 2013.

(51) Int. Cl.
*A47J 37/06* (2006.01)

(52) U.S. Cl.
CPC ...... *A47J 37/0611* (2013.01); *A47J 2037/0617* (2013.01)

(58) Field of Classification Search
CPC .................. A47J 37/0611; A47J 2037/0617; A21B 5/023
USPC ........... 99/372, 374, 376, 377, 379, 380, 381, 99/382
See application file for complete search history.

(56) References Cited

U.S. PATENT DOCUMENTS

| 1,648,335 | A | * | 11/1927 | Cole | ................... A47J 37/0611 99/374 |
| 2,066,507 | A | | 1/1937 | Yost | |
| 2,116,688 | A | | 5/1938 | Ratliff | |
| 2,314,872 | A | * | 3/1943 | Dickey | ............... A47J 37/0611 99/340 |

(Continued)

FOREIGN PATENT DOCUMENTS

| BR | MU8900462 | U2 | 5/2011 | |
| CN | 102740750 | A | 9/2010 | |
| EP | 2036473 | | * 3/2009 | .......... A47J 37/0611 |

*Primary Examiner* — Reginald L Alexander
(74) *Attorney, Agent, or Firm* — Alexander D. Raring

(57) ABSTRACT

A small cooking appliance comprises a bottom housing, a top housing, and a ring assembly. The bottom housing has a top surface that forms a bottom cooking surface. The top housing has a bottom surface that forms a top cooking surface. The top housing is movably attached to the bottom housing and moveable between a closed position and an open position. The ring assembly is positioned between the top and bottom cooking surfaces when the top housing is in its closed position. The ring assembly comprises a top ring, a bottom ring, and a center cooking plate. The center cooking plate is adapted to be removably inserted between the top ring and the bottom ring such that a space defined by the ring assembly is divided into top and bottom cooking cavities when the center cooking plate is inserted between the top ring and the bottom ring.

18 Claims, 21 Drawing Sheets

(56) References Cited

U.S. PATENT DOCUMENTS

| | | | |
|---|---|---|---|
| 2,469,595 A * | 5/1949 | Foster | A47J 37/0611 99/374 |
| 4,803,918 A | 2/1989 | Carbon et al. | |
| 4,967,650 A | 11/1990 | Weigle | |
| 5,535,664 A | 7/1996 | Rokowski | |
| 5,639,498 A | 6/1997 | Bakosch | |
| 5,642,658 A | 7/1997 | Liebermann | |
| 5,983,784 A | 11/1999 | Goldberg | |
| 6,443,052 B1 | 9/2002 | Garber | |
| 6,555,795 B2 | 4/2003 | Glucksman et al. | |
| 6,772,678 B2 | 8/2004 | Choi et al. | |
| 7,005,616 B2 | 2/2006 | Kim et al. | |
| 7,238,921 B2 | 7/2007 | Beesley et al. | |
| 7,250,587 B2 | 7/2007 | Ely et al. | |
| 7,250,588 B2 | 7/2007 | Ely et al. | |
| 7,467,583 B2 | 12/2008 | Lam | |
| 2008/0105137 A1 | 5/2008 | Genslak et al. | |
| 2009/0139412 A1 | 6/2009 | Zhan | |

\* cited by examiner

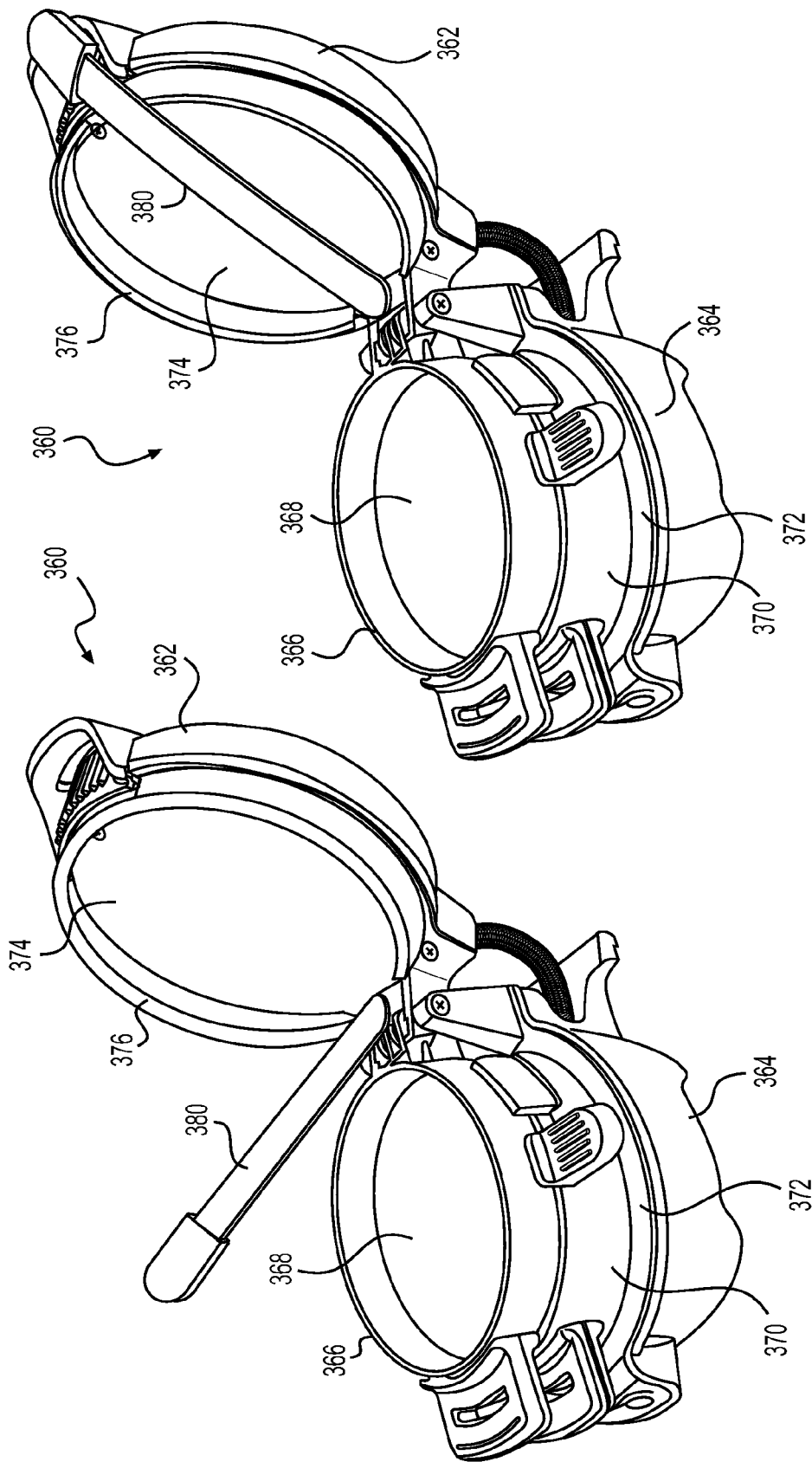

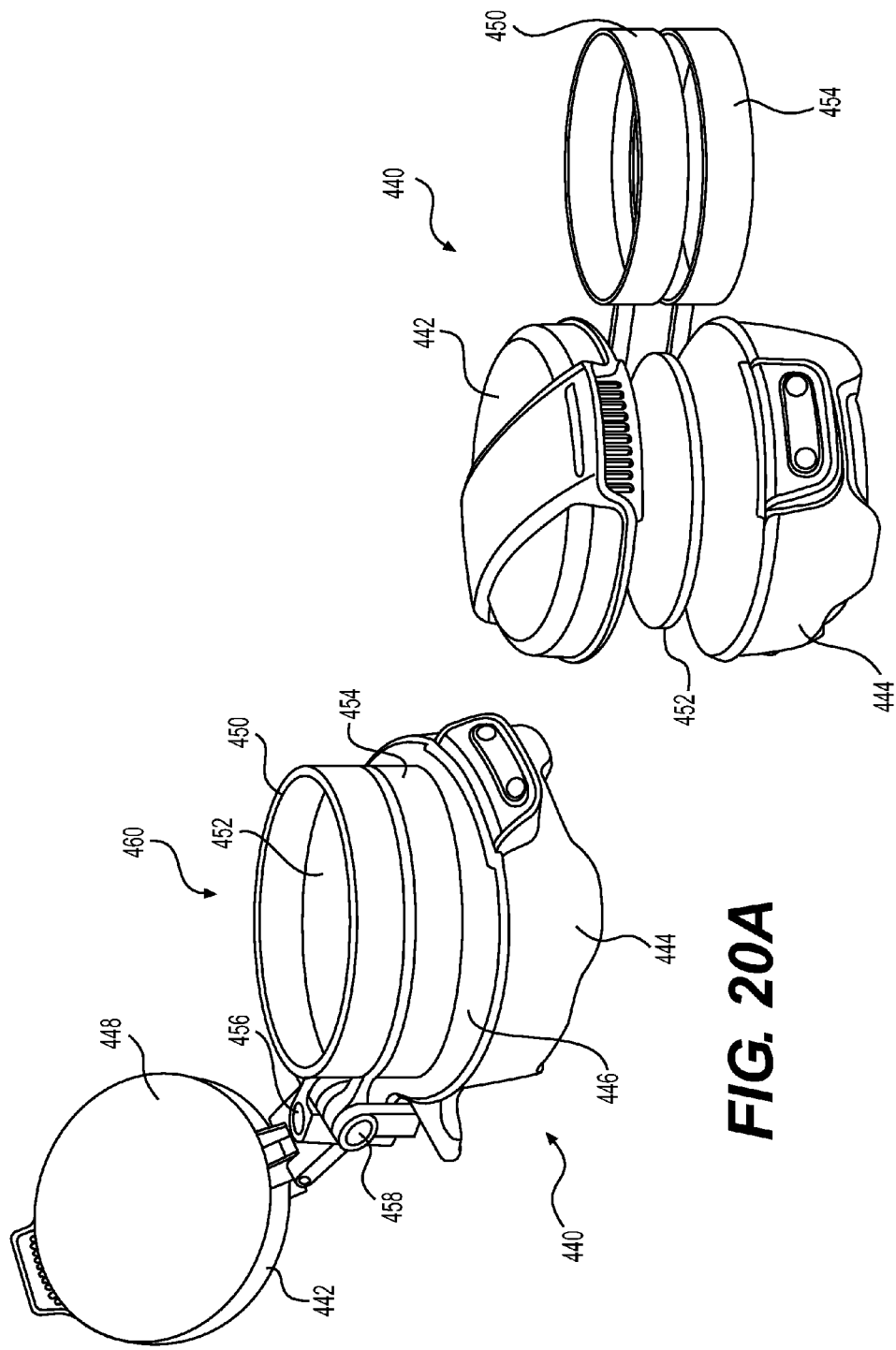

SANDWICH MAKING APPLIANCE AND METHOD OF MAKING A SANDWICH WITH THE SAME

CROSS-REFERENCE TO RELATED APPLICATIONS

This application is a continuation-in-part of and claims priority to U.S. patent application Ser. No. 13/740,594 filed Jan. 14, 2013, the contents of which are incorporated herein by reference in its entirety.

FIELD OF THE DISCLOSURE

The present disclosure relates generally to appliances, and more particularly to small cooking appliances.

BACKGROUND OF THE DISCLOSURE

Hot sandwiches, particularly breakfast sandwiches, are popular food items, whether ordered in a restaurant or made at home. Hot sandwiches may include multiple different individual filling components layered between two pieces of bread. For example, a hot breakfast sandwich can be made from English muffins, bagels, pancakes, waffles, or the like. The filling components for hot sandwiches vary greatly. Typical filling components of a breakfast sandwich could include ham, bacon, Canadian bacon, sausage patties, vegetables, cheese, egg, and the like and various combinations thereof.

Making hot sandwiches at home, particularly breakfast sandwiches, can be a complicated and time-consuming task. Multiple appliances must be used to separately prepare the individual components, which are then assembled into a complete sandwich. For example, a toaster may be used to toast the English muffin and a microwave may be used to heat pre-cooked ham. A skillet or griddle appliance or the same on a stovetop appliance might be required to cook the egg. The use of multiple appliances causes difficulty coordinating the preparation of the individual components to ensure that all the individual components are done and ready at about the same time, thereby resulting in a complete sandwich in which all components are properly cooked and at desired temperatures. Moreover, the process of cleaning the various appliances adds additional time, frustration, and complexity to the home cooking process.

It has heretofore not been discovered how to create a kitchen appliance that is capable of preparing a hot sandwich whereby all the components are heated, toasted, and/or cooked so that a fully assembled sandwich is presented to a user. The appliance of the following disclosure accomplishes the above and other objectives and overcomes at least the above-described disadvantages of conventional kitchen appliances and methods of making hot sandwiches.

BRIEF SUMMARY OF THE DISCLOSURE

A kitchen appliance for preparing, assembling, and warming/cooking a hot sandwich is disclosed herein. In one embodiment of the subject appliance, the sandwich making appliance comprises a bottom housing, a top housing, and a ring assembly. The bottom housing has a top surface that forms a bottom cooking surface of the appliance. The top housing has a bottom surface that forms a top cooking surface of the appliance. The top housing is movably attached to the bottom housing. The top housing is moveable between a closed position and an open position. The ring assembly is positioned between the top and bottom cooking surfaces when the top housing is in its closed position. The ring assembly comprises a top ring, a bottom ring, and a center cooking plate. The center cooking plate is adapted to be removably inserted between the top ring and the bottom ring such that a space defined by the ring assembly is divided into top and bottom cooking cavities when the center cooking plate is inserted between the top ring and the bottom ring. The top cooking cavity is formed by the top cooking surface, the top ring, and the center cooking plate when the top housing is in its closed position and when the center cooking plate is inserted between the top ring and the bottom ring. The bottom cooking cavity is formed by the bottom cooking surface, the bottom ring, and the center cooking plate when the top housing is in its closed position and when the center cooking plate is inserted between the top ring and the bottom ring.

The ring assembly may be selectively movably attached to the bottom housing to enable the ring assembly to move between a closed position and an open position.

The top ring may be selectively movably attached to the bottom housing to enable the top ring to move between a closed position and an open position. The bottom ring may be selectively movably attached to the bottom housing to enable the bottom ring to move between a closed position and an open position. The top ring may be adapted to move independently of the top housing and independently of the bottom ring. The bottom ring may be adapted to move independently of the top housing and independently of the top ring.

The center cooking plate may be adapted to be removably inserted between the top ring and the bottom ring while the top and bottom rings are in their respective closed positions.

The ring assembly may further comprise at least one spacer element to maintain a desired spacing between the top and bottom rings while the top and bottom rings are in their respective closed positions.

The ring assembly may further comprise one or more stop guides, such that the center cooking plate engages the one or more stop guides when the center cooking plate is inserted between the top ring and the bottom ring such that the center cooking plate fully overlaps a bottom open end of the top ring and a top open end of the bottom ring.

The ring assembly may be removably attached to the bottom housing at a hinge point. The ring assembly may comprise a hinge pin about which the top and bottom rings hinge, the hinge pin having opposing ends, the opposing ends of the hinge pin having different diameters. The hinge point may comprise opposing channels for receiving opposing ends of the hinge pin, the opposing channels having different sizes corresponding to the different diameters of the opposing ends of the hinge pin. The opposing channels may be angled relative to a plane of the top cooking surface when the top housing is in its closed position such that the ring assembly cannot be removed from the hinge point when the top housing is in the closed position.

The appliance may further comprise one or more heating elements in at least one of the top housing and the bottom housing to heat at least one of the top cooking surface and the bottom cooking surface. When the top housing is in a closed position and the center cooking plate is inserted between the top ring and the bottom ring, contact is maintained between (i) the bottom cooking surface and the bottom ring, (ii) the bottom ring and the center cooking plate, (iii) the center cooking plate and the top ring, and (iv) the top ring and the top cooking surface.

The appliance may further comprise a plurality of handles separately affixed to each of the top housing, the top ring, and the bottom ring to enable a user to independently move the top housing, the top ring, and the bottom ring. At least one of the plurality of handles have one or more through-holes defined therein. The appliance may further comprise a handle affixed to the center cooking plate to enable a user to removably insert the center cooking plate.

In one alternative embodiment of the disclosure, an appliance for cooking a food item comprises a bottom housing, a top housing, and a ring assembly. The bottom housing has a top surface that forms a bottom cooking surface of the appliance. The top housing has a bottom surface that forms a top cooking surface of the appliance. The top housing is movably attached to the bottom housing and is moveable between a closed position and an open position. The ring assembly is positioned between the top and bottom cooking surfaces when the top housing is in its closed position. The ring assembly comprises a top ring, a bottom ring, and a center cooking plate therebetween. The center cooking plate divides a space defined by the ring assembly into top and bottom cooking cavities. The top ring, the bottom ring, and the center cooking plate each comprise left and right portions. The left portions of the top ring, the bottom ring, and the center cooking plate together comprise a left ring assembly portion. The right portions of the top ring, the bottom ring, and the center cooking plate together comprise a right ring assembly portion. The left ring assembly portion and the right ring assembly portion are movable in relation to each other and to the top and bottom housings. The top cooking cavity is formed by the top cooking surface, the top ring, and the center cooking plate when the top housing is in its closed position and when the left and right ring assembly portions are positioned abutting each other. The bottom cooking cavity is formed by the bottom cooking surface, the bottom ring, and the center cooking plate when the top housing is in its closed position and when the left and right ring assembly portions are positioned abutting each other.

The left ring assembly portion may comprise a unitary left ring assembly portion such that the left portions of the top ring, the bottom ring, and the center cooking plate are unitary and are movable only in unison. The right ring assembly portion may comprise a unitary right ring assembly portion such that the right portions of the top ring, the bottom ring, and the center cooking plate are unitary and are movable only in unison.

The unitary left ring assembly portion and the unitary right ring assembly portion may be pivotably affixed to each other.

The unitary left ring assembly portion and the unitary right ring assembly portion may be each affixed to a rack and pinion mechanism such that the unitary left ring assembly portion and the unitary right ring assembly portion are linearly movable toward each other and away from each other.

The appliance may further comprise one or more heating elements in at least one of the top housing and the bottom housing to heat at least one of the top cooking surface and the bottom cooking surface. When the top housing is in a closed position and the left and right ring assembly portions are positioned between the top and bottom cooking surfaces and abutting each other, contact is maintained between (i) the bottom cooking surface and the left and right ring assembly portions, and (ii) the left and right ring assembly portions and the top cooking surface.

In another alternative embodiment of the disclosure, an appliance for cooking a food item comprises a bottom housing, a top housing, a ring assembly, and a food item support supporting a first food item above a second food item when the second food item is in the top cooking cavity. The bottom housing has a top surface that forms a bottom cooking surface of the appliance. The top housing has a bottom surface that forms a top cooking surface of the appliance. The top housing is movably attached to the bottom housing and moveable between a closed position and an open position. The ring assembly is positioned between the top and bottom cooking surfaces when the top housing is in its closed position. The ring assembly comprises a top ring, a bottom ring, and a center cooking plate selectively therebetween. The center cooking plate divides a space defined by the ring assembly into top and bottom cooking cavities.

The food item support that is operable to selectively support a first food item may comprise one or more support arms selectively slidably insertable through a wall of the top ring.

The food item support that is operable to selectively support a first food item may comprise a support arm movably affixed to the top housing. The support arm may be movably affixed to the top cooking surface of the top housing. The support arm may be pivotably affixed to the top housing.

The top housing may further comprise a top housing cavity for holding the first food item. The food item support selectively supporting a first food item may comprise a support arm movably affixed to the top housing. The support arm is selectively movable between a first position at least partly blocking an opening of the top housing cavity to retain the first food item in the top housing cavity and a second position not blocking the opening of the top housing cavity such that the first food item is not retained in the top housing cavity.

The top housing may further comprise a top housing cavity for holding the first food item. The food item support for selectively supporting a first food item may comprise opposing movable jaws positioned within the top housing cavity for retaining the first food item. The opposing movable jaws are selectively movable between a first position for receiving or discharging the first food item and a second position for retaining the first food item with the top housing cavity.

The ring assembly may be selectively movably attached to the bottom housing to enable the ring assembly to move between an up position and a down position.

The top ring may be selectively movably attached to the bottom housing to enable the top ring to move between a closed position and an open position. The bottom ring may be selectively movably attached to the bottom housing to enable the bottom ring to move between a closed position and an open position. The top ring may be adapted to move independently of the top housing and independently of the bottom ring. The bottom ring may be adapted to move independently of the top housing and independently of the top ring.

The center cooking plate may be movable between (i) a closed position dividing the space defined by the ring assembly into top and bottom cooking cavities and (ii) an open position. The center cooking plate may be moveable between its open position and its closed position while the top and bottom rings are in their respective closed positions. The center cooking plate may be pivotably attached to at least one of the top ring and the bottom ring. When the center cooking plate is in its open position, at least a portion of the center cooking plate may remain between the top and bottom rings while the top and bottom rings are in their respective closed positions. The ring assembly may further comprise an open position stop guide to limit the movement of the center cooking plate so that, when the center cooking plate is in its open position, at least a portion of the center cooking plate remains between the top and bottom rings. The ring assembly may further comprise at least one spacer element to maintain a desired spacing between the top and bottom rings while the top and bottom rings are in their respective closed positions. The ring assembly may further comprise a closed position stop guide, such that the center cooking plate engages the closed position stop guide when the center cooking plate is in the closed position such that the center cooking plate fully overlaps a bottom open end of the top ring and a top open end of the bottom ring.

The ring assembly may be removably attached to the bottom housing at a hinge point. The ring assembly may comprise a hinge pin about which the top and bottom rings hinge, the hinge pin having opposing ends, the opposing ends of the hinge pin having different diameters. The hinge point may comprise opposing channels for receiving opposing ends of the hinge pin, the opposing channels having different sizes corresponding to the different diameters of the opposing ends of the hinge pin. The opposing channels may be angled relative to a plane of the top cooking surface when the top housing is in its closed position such that the ring assembly cannot be removed from the hinge point when the top housing is in the closed position.

The appliance may further comprise one or more heating elements in at least one of the top housing and the bottom housing to heat at least one of the top cooking surface and the bottom cooking surface. When the top housing is in a closed position, contact is maintained between (i) the bottom cooking surface and the bottom ring, (ii) the bottom ring and the center cooking plate, (iii) the center cooking plate and the top ring, and (iv) the top ring and the top cooking surface.

The appliance may further comprise a plurality of handles separately affixed to each of the top housing, the top ring, and the bottom ring to enable a user to independently move the top housing, the top ring, and the bottom ring. At least one of the plurality of handles may have one or more through-holes defined therein. The appliance may further comprise handle affixed to the center cooking plate to enable a user to slide or pivot the center cooking plate.

In another alternative embodiment of the disclosure, an appliance for cooking a food item comprises a bottom housing, a top housing, a ring assembly, and a food item support for selectively supporting a first food item above a second food item when the second food item is in the top cooking cavity. The bottom housing has a top surface that forms a bottom cooking surface of the appliance. The top housing has a bottom surface that forms a top cooking surface of the appliance. The top housing is movably attached to the bottom housing and moveable between a closed position and an open position. The ring assembly is positioned between the top and bottom cooking surfaces when the top housing is in its closed position. The ring assembly comprises a top ring, a bottom ring, and a center cooking plate. The center cooking plate is movable between (i) a closed position in which a space defined by the ring assembly is divided into top and bottom cooking cavities and (ii) an open position. The top cooking cavity is formed by the top cooking surface, the top ring, and the center cooking plate when the top housing and the center cooking plate are in their respective closed positions. The bottom cooking cavity is formed by the bottom cooking surface, the bottom ring, and the center cooking plate when the top housing and the center cooking plate are in their respective closed positions.

The center cooking plate may comprise a tab that projects outward from a side edge of the center cooking plate and that remains outside of the top and bottom rings when the center cooking plate is in its closed position. A generally horizontal slot may be defined in the top ring. The food item support for selectively supporting a first food item may comprise a support arm affixed to the tab of the center cooking plate, the support arm projecting upward from the tab of the center cooking plate and then generally horizontally over a center of the center cooking plate. The support arm projects through the slot defined in the top ring when the center cooking plate is in its closed position. The support arm does not project through the slot defined in the top ring and is outside of the top and bottom rings when the center cooking plate is in its open position.

A generally vertical slot may be defined in the top ring, the slot extending from a bottom edge of the top ring toward but not reaching a top edge of the top ring. The food item support for selectively supporting a first food item may comprise a curved, generally vertical ridge projecting upward from a top surface of the center cooking ring. The ridge extends from an edge of the center cooking plate past a midpoint of the center cooking plate. The ridge cooperatively passes through the slot as the center cooking plate moves between its open and closed positions.

The ring assembly may be selectively movably attached to the bottom housing to enable the ring assembly to move between a closed position and an open position.

The top ring may be selectively movably attached to the bottom housing to enable the top ring to move between a closed position and an open position. The bottom ring may be selectively movably attached to the bottom housing to enable the bottom ring to move between a closed position and an open position. The top ring may be adapted to move independently of the top housing and independently of the bottom ring. The bottom ring may be adapted to move independently of the top housing and independently of the top ring.

The center cooking plate may be moveable between its open position and its closed position while the top and bottom rings are in their respective closed positions. The center cooking plate may be pivotably attached to at least one of the top ring and the bottom ring. When the center cooking plate is in its open position, at least a portion of the center cooking plate remains between the top and bottom rings while the top and bottom rings are in their respective closed positions. The ring assembly may further comprise an open position stop guide to limit the movement of the center cooking plate so that when the center cooking plate is in its open position, at least a portion of the center cooking plate remains between the top and bottom rings. The ring assembly may further comprise at least one spacer element to maintain a desired spacing between the top and bottom rings while the top and bottom rings are in their respective closed positions. The ring assembly may further comprise a closed position stop guide such that the center cooking plate engages the closed position stop guide when the center cooking plate is in the closed position such that the center cooking plate fully overlaps a bottom open end of the top ring and a top open end of the bottom ring.

The ring assembly may be removably attached to the bottom housing at a hinge point. The ring assembly may comprise a hinge pin about which the top and bottom rings hinge, the hinge pin having opposing ends, the opposing ends of the hinge pin having different diameters. The hinge point may comprise opposing channels for receiving opposing ends of the hinge pin, the opposing channels having different sizes corresponding to the different diameters of the opposing ends of the hinge pin. The opposing channels may be angled relative to a plane of the top cooking surface when the top housing is in its closed position such that the ring assembly cannot be removed from the hinge point when the top housing is in the closed position.

The appliance may further comprise one or more heating elements in at least one of the top housing and the bottom housing to heat at least one of the top cooking surface and the bottom cooking surface. When the top housing is in a closed position, contact is maintained between (i) the bottom cooking surface and the bottom ring, (ii) the bottom ring and the center cooking plate, (iii) the center cooking plate and the top ring, and (iv) the top ring and the top cooking surface.

The appliance may further comprise a plurality of handles separately affixed to each of the top housing, the top ring, and the bottom ring to enable a user to independently move the top housing, the top ring, and the bottom ring. At least one of the plurality of handles may have one or more through-holes defined therein. The appliance may further comprise a handle affixed to the center cooking plate to enable a user to slide or pivot the center cooking plate.

In another alternative embodiment of the disclosure, an appliance for cooking a food item comprises a bottom housing, a top housing, and a ring assembly. The bottom housing has a top surface that forms a bottom cooking surface of the appliance. The top housing has a bottom surface that forms a top cooking surface of the appliance. The top housing is movably attached to the bottom housing and moveable between a closed position and an open position. The ring assembly is positioned between the top and bottom cooking surfaces when the top housing is in its closed position. The ring assembly comprises a top ring, a bottom ring, and a center cooking plate. The center cooking plate comprises left and right portions that are movable in relation to each other. The top cooking cavity is formed by the top cooking surface, the top ring, and the center cooking plate when the top housing is in its closed position and the left and right center cooking plate portions are positioned abutting each other. The bottom cooking cavity is formed by the bottom cooking surface, the bottom ring, and the center cooking plate when the top housing is in its closed position and the left and right center cooking plate portions are positioned abutting each other.

The left and right center cooking plate portions may be pivotably movable in relation to each other.

The left and right center cooking plate portions may be movable between a closed position in which the left and right center cooking plate portions abut each other and an open position in which the left and right center cooking plate portions are a maximum distance apart.

The ring assembly may be selectively movably attached to the bottom housing to enable the ring assembly to move between a closed position and an open position.

The top ring may be selectively movably attached to the bottom housing to enable the top ring to move between a closed position and an open position. The bottom ring may be selectively movably attached to the bottom housing to enable the bottom ring to move between a closed position and an open position. The ring may be adapted to move independently of the top housing and independently of the bottom ring. The bottom ring may be adapted to move independently of the top housing and independently of the top ring.

The left and right center cooking plate portions may be moveable while the top and bottom rings are in their respective closed positions. The center cooking plate may be pivotably attached to at least one of the top ring and the bottom ring. When the center cooking plate is in its open position, at least a portion of the center cooking plate may remain between the top and bottom rings while the top and bottom rings are in their respective closed positions.

The ring assembly may be removably attached to the bottom housing at a hinge point. The ring assembly may comprise a hinge pin about which the top and bottom rings hinge, the hinge pin having opposing ends, the opposing ends of the hinge pin having different diameters. The hinge point may comprise opposing channels for receiving opposing ends of the hinge pin, the opposing channels having different sizes corresponding to the different diameters of the opposing ends of the hinge pin. The opposing channels may be angled relative to a plane of the top cooking surface when the top housing is in its closed position such that the ring assembly cannot be removed from the hinge point when the top housing is in the closed position.

The appliance may further comprise one or more heating elements in at least one of the top housing and the bottom housing to heat at least one of the top cooking surface and the bottom cooking surface. When the top housing is in a closed position, contact is maintained between (i) the bottom cooking surface and the bottom ring, (ii) the bottom ring and the center cooking plate, (iii) the center cooking plate and the top ring, and (iv) the top ring and the top cooking surface.

The appliance may further comprise a plurality of handles separately affixed to each of the top housing, the top ring, and the bottom ring to enable a user to independently move the top housing, the top ring, and the bottom ring. At least one of the plurality of handles may have one or more through-holes defined therein. The appliance may further comprise a handle affixed to each of the left and right portions of the cooking plate to enable a user to independently slide or pivot each of the left and right portions of the center cooking plate.

In another alternative embodiment of the disclosure, an appliance for cooking a food item comprises a bottom housing, a top housing, and a ring assembly. The bottom housing has a top surface that forms a bottom cooking surface of the appliance. The top housing has a bottom surface that forms a top cooking surface of the appliance. The top housing is movably attached to the bottom housing and moveable between a closed position and an open position. The ring assembly is positioned between the top and bottom cooking surfaces when the top housing is in its closed position. The ring assembly comprises a top ring, a bottom ring, and a center cooking plate therebetween. The top ring is selectively movably attached to the bottom housing to enable the top ring to pivotably move up and down between a vertically open position and a vertically closed position and to enable the top ring to pivotably move side to side between a horizontally open position in which the top ring is not coincident with the center cooking plate and a horizontally closed position in which the top ring is coincident with the center cooking plate. The bottom ring is selectively movably attached to the bottom housing to enable the bottom ring to pivotably move up and down between a vertically open position and a vertically closed position and to enable the bottom ring to pivotably move side to side between a horizontally open position in which the bottom ring is not coincident with the center cooking plate and a horizontally closed position in which the bottom ring is coincident with the center cooking plate. The center cooking plate is selectively movably attached to the bottom housing to enable the center cooking plate to pivotably move up into an open position and down into a closed position. A top cooking cavity is formed by the top cooking surface, the top ring, and the center cooking plate when the top housing and the center cooking plate are in their respective closed positions and the top ring is in both its vertically closed position and its horizontally closed position. A bottom cooking cavity is formed by the bottom cooking surface, the bottom ring, and the center cooking plate when the top housing and the center cooking plate are in their respective closed positions and the bottom ring is in both its vertically closed position and its horizontally closed position.

The top ring is adapted to move independently of the top housing, independently of the center cooking plate, and independently of the bottom ring. The bottom ring is adapted to move independently of the top housing, independently of the center cooking plate, and independently of the top ring.

The appliance may further comprise one or more heating elements in at least one of the top housing and the bottom housing to heat at least one of the top cooking surface and the bottom cooking surface. When the top housing is in its closed position, the top ring is in both its vertically closed position and its horizontally closed position, and the bottom ring is in both its vertically closed position and its horizontally closed position, contact is maintained between (i) the bottom cooking surface and the bottom ring, (ii) the bottom ring and the center cooking plate, (iii) the center cooking plate and the top ring, and (iv) the top ring and the top cooking surface.

The appliance may further comprise a plurality of handles separately affixed to each of the top housing, the top ring, the bottom ring, and the center cooking plate to enable a user to independently move the top housing, the top ring, the bottom ring, and the center cooking plate. At least one of the plurality of handles have one or more through-holes defined therein In addition to the sandwich making appliances, as described above, other embodiments of the disclosure are directed to methods for cooking a food item using the above-described appliances.

BRIEF DESCRIPTION OF THE SEVERAL VIEWS OF THE DRAWING(S)

Having thus described the subject apparatus and method in general terms, reference will now be made to the accompanying drawings, which are not necessarily drawn to scale. The foregoing summary, as well as the following detailed description of the disclosure, will be better understood when read in conjunction with the appended drawings. It should be understood, however, that the disclosure is not limited to the precise arrangements and instrumentalities shown, wherein:

Figure 13:
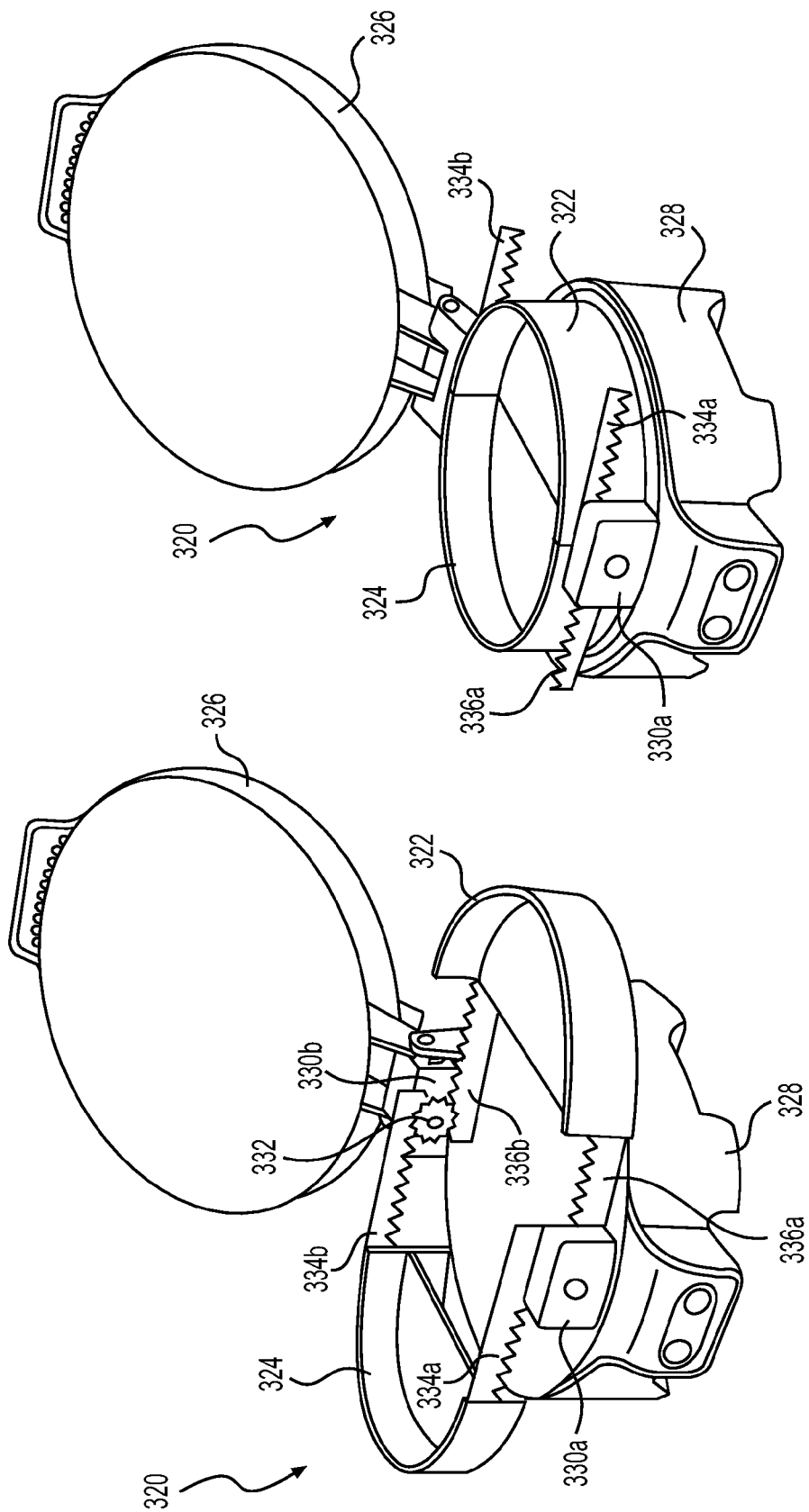

FIGS. 13A-B are isometric views of a sandwich making appliance, in accordance with alternative embodiments of the present disclosure.

Figure 14:
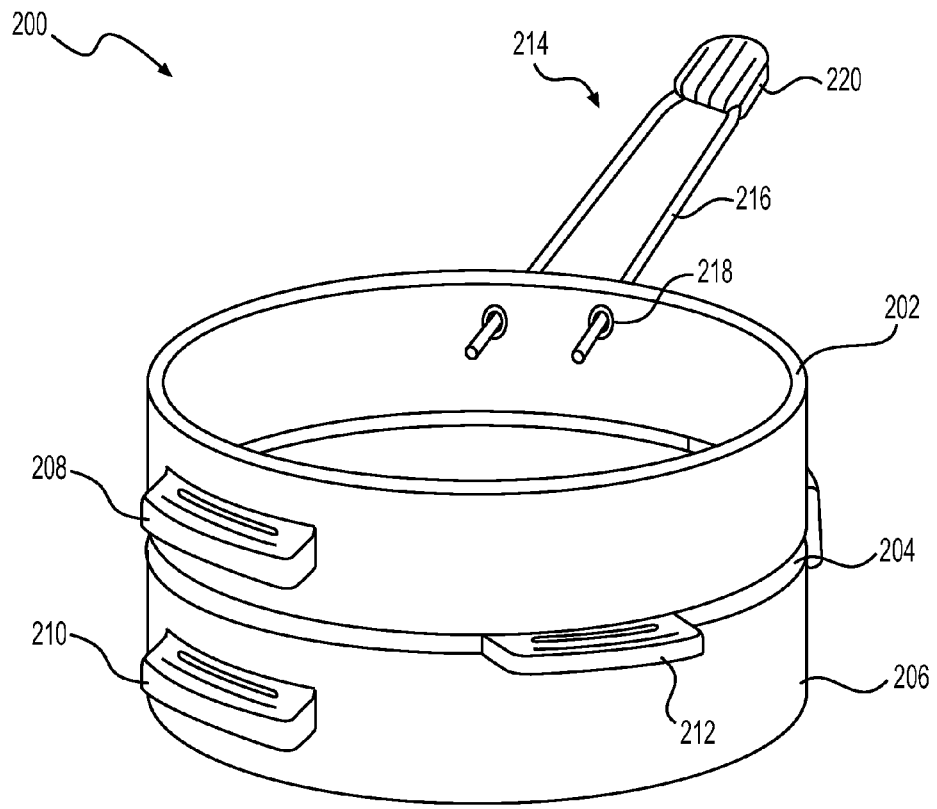

FIG. 14 is an isometric view of a ring assembly of a sandwich making appliance, removed from the appliance, in accordance with alternative embodiments of the present disclosure.

Figure 15A:
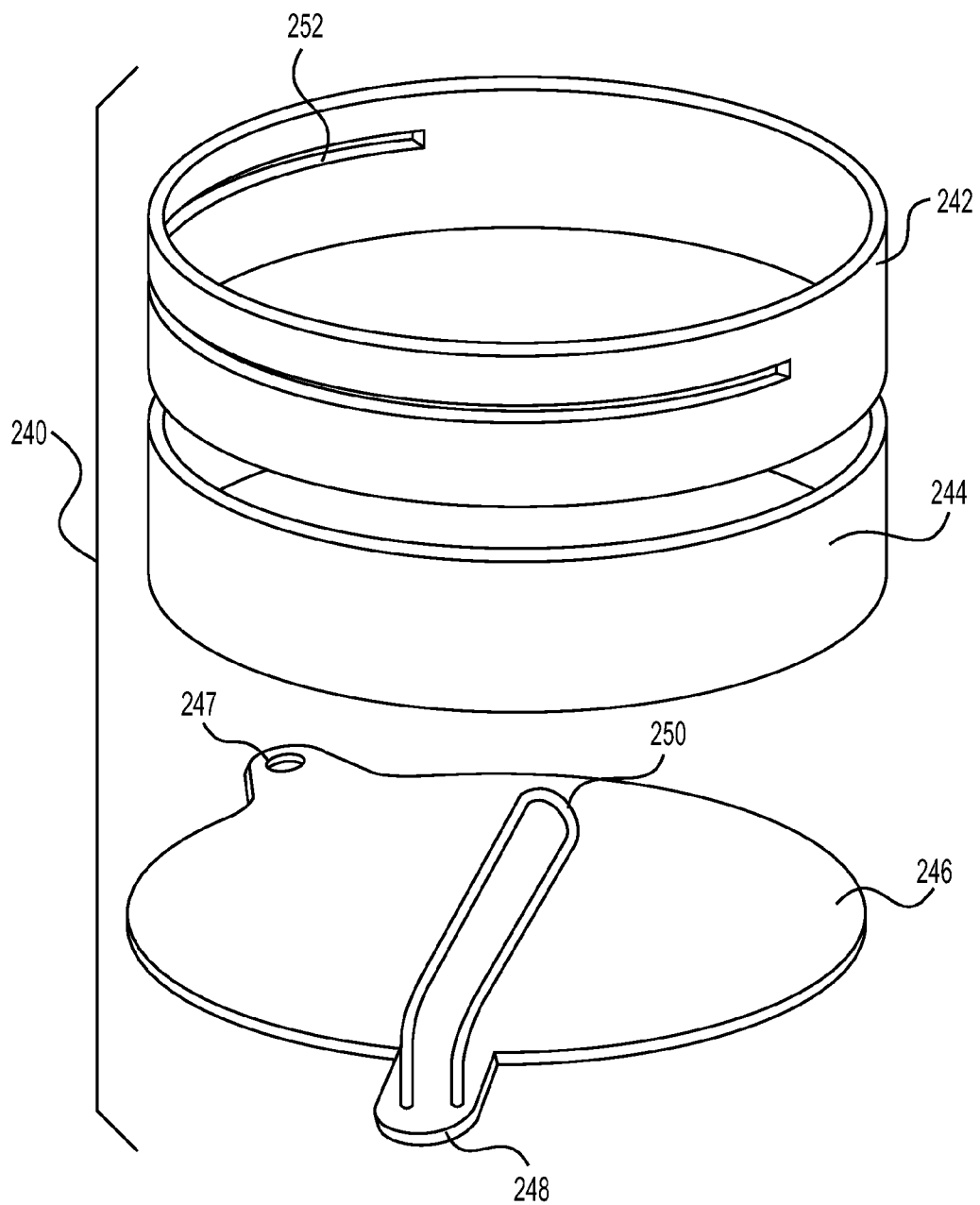
Figure 15B:
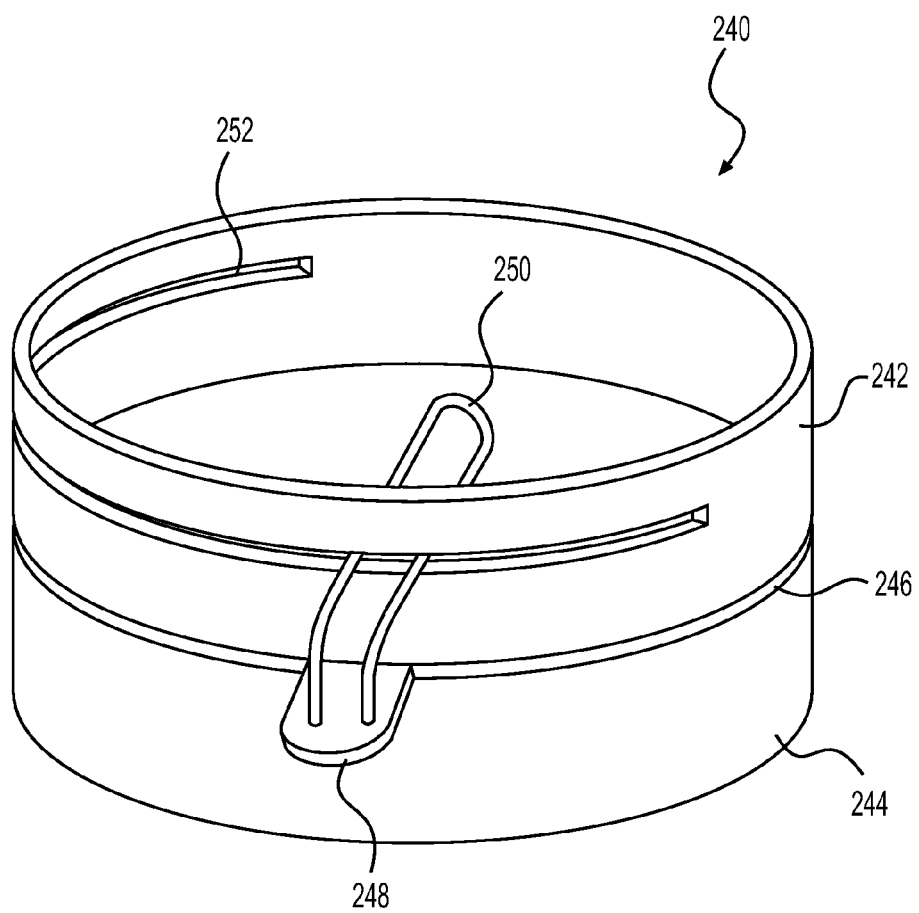

FIGS. 15A-B are isometric views of a ring assembly of a sandwich making appliance, removed from the appliance, in accordance with alternative embodiments of the present disclosure.

Figures 16A, 16B:
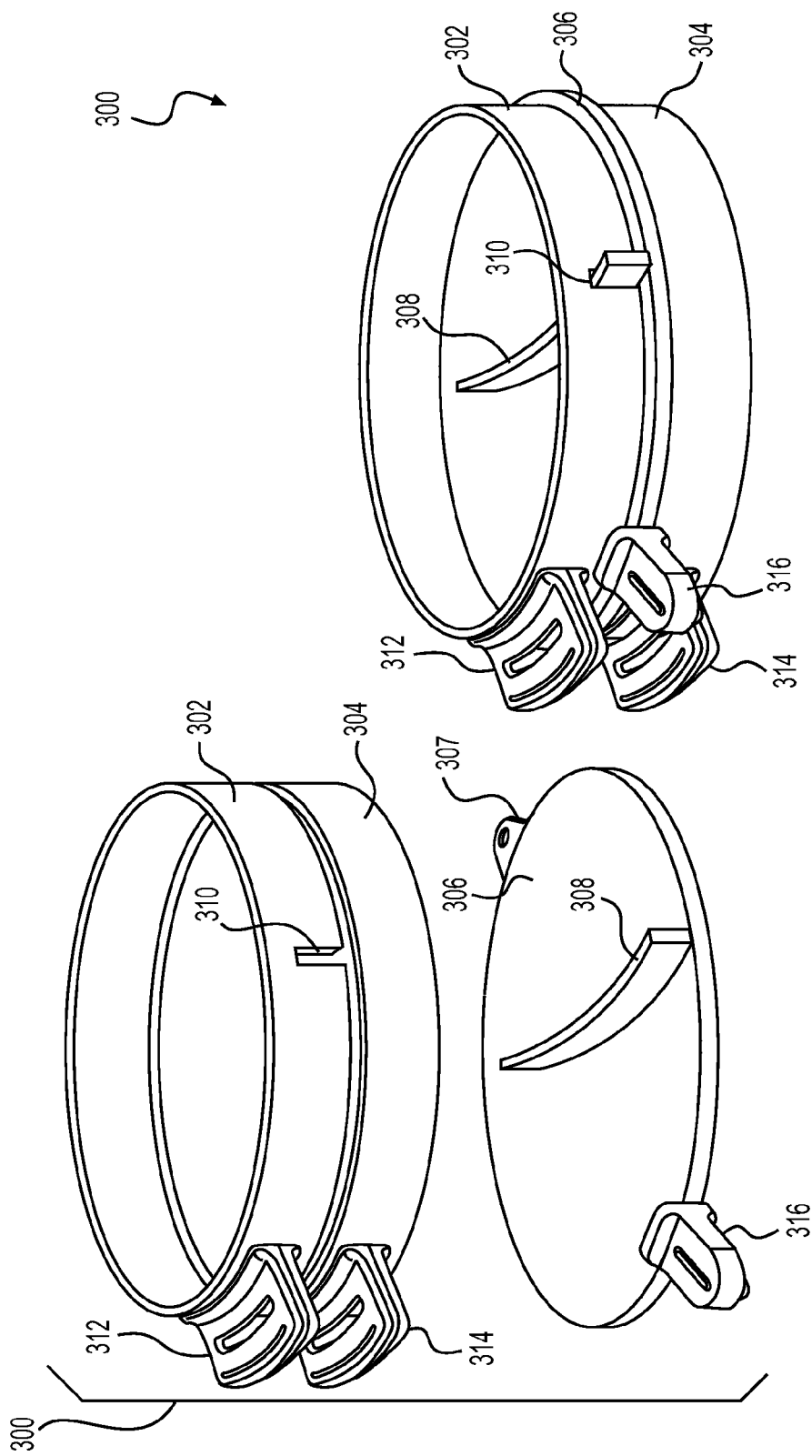

FIGS. 16A-B are isometric views of a ring assembly of a sandwich making appliance, removed from the appliance, in accordance with alternative embodiments of the present disclosure.

Figure 17:
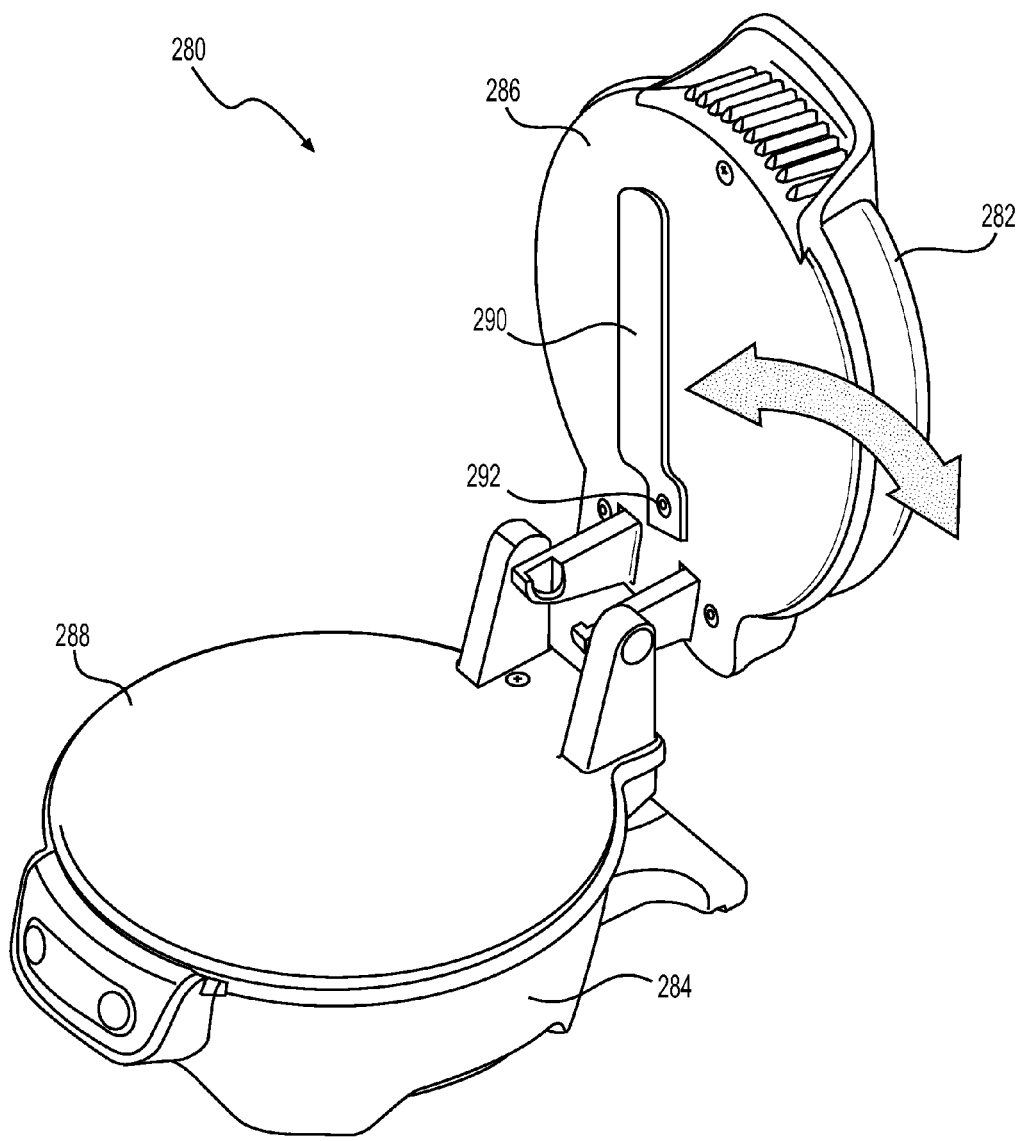

FIG. 17 is an isometric view of a sandwich making appliance, in accordance with alternative embodiments of the present disclosure.

FIGS. 18A-B are isometric views of a sandwich making appliance, in accordance with alternative embodiments of the present disclosure.

Figures 19A, 19B, 19C:
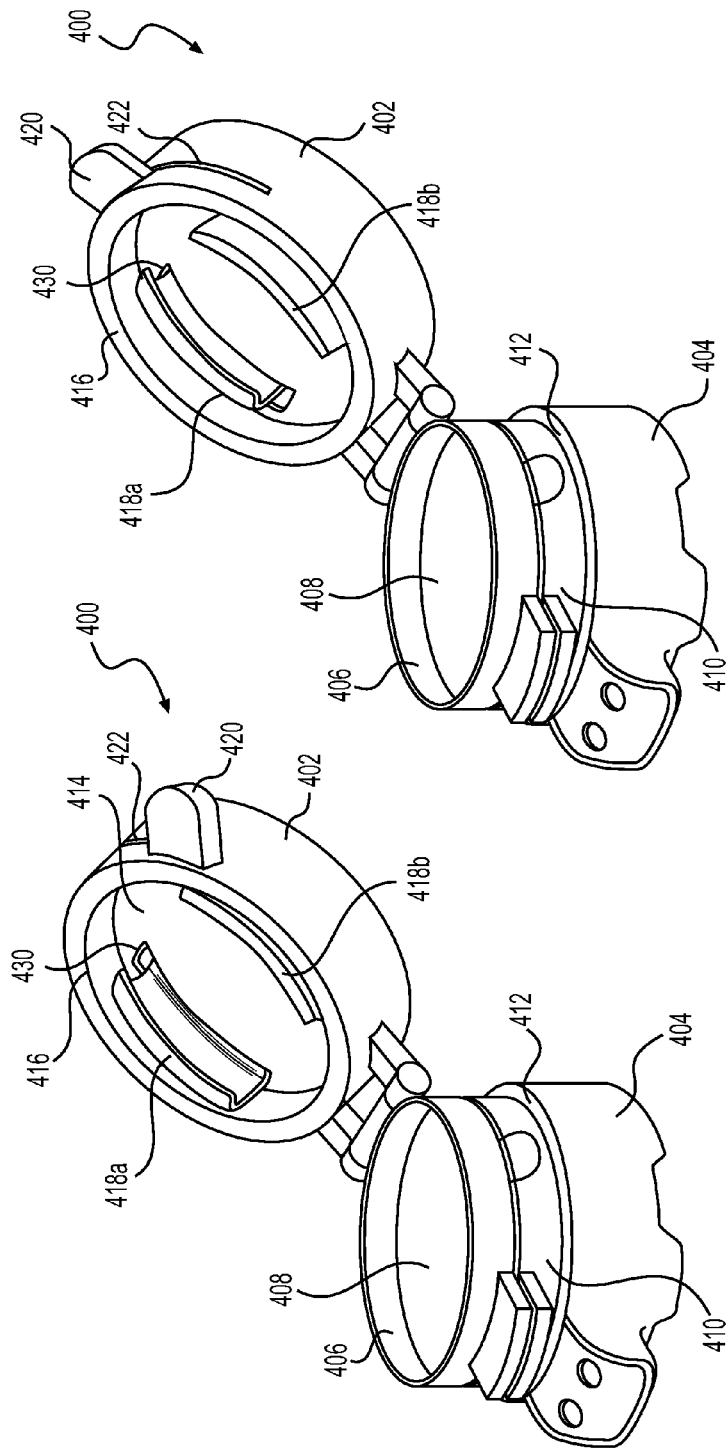

FIGS. 19A-C are isometric views of a sandwich making appliance, in accordance with alternative embodiments of the present disclosure.

FIGS. 20A-B are isometric views of a sandwich making appliance, in accordance with alternative embodiments of the present disclosure.

DETAILED DESCRIPTION OF THE DISCLOSURE

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of appliance disclosed herein provide a sandwich making appliance that enables a user to easily and efficiently assemble and cook a sandwich (or any suitable food item) and then easily remove the fully assembled and cooked sandwich from the appliance. Advantageously, the appliance is able to apply heat to cook an individual filling components that is within (i.e., makes up one of the internal layers of) the sandwich. The appliance decreases the frustration, complexity, and time of individually assembling such a sandwich. Further, among other benefits, the appliance is easy to clean relative to the traditional approach of individually cooking, heating, and/or toasting the individual components of the sandwich.

Referring now to FIGS. 1-6 wherein like numerals indicate like elements throughout, there is illustrated a kitchen appliance 10 in accordance with an embodiment of the present disclosure. Appliance 10 comprises top housing 12 and bottom housing 14. Top housing 12 is movably attached to bottom housing 14, such that the top housing is movable between a closed or down position (illustrated in FIGS. 1, 4, and 5) and an open or up position (illustrated in FIGS. 2, 3, and 6). In the illustrated embodiment, top housing 12 is hingedly attached to bottom housing 14. However, any suitable movable attachment structure or method may be used to attach top housing 12 to bottom housing 14, such as pivotal or prismatic. Top housing 12 has a bottom surface that forms a top cooking surface 16 of the appliance. Bottom housing 14 has a top surface that forms a bottom cooking surface 18 of the appliance. Top cooking surface 16 and bottom cooking surface 18 are typically substantially planar and typically comprise a conductive metal with a non-stick coating. In operation, top surface 16 and bottom surface 18 are heated by one or more heating elements located, respectively, in the top and bottom housing (described further below).

Figure 1:
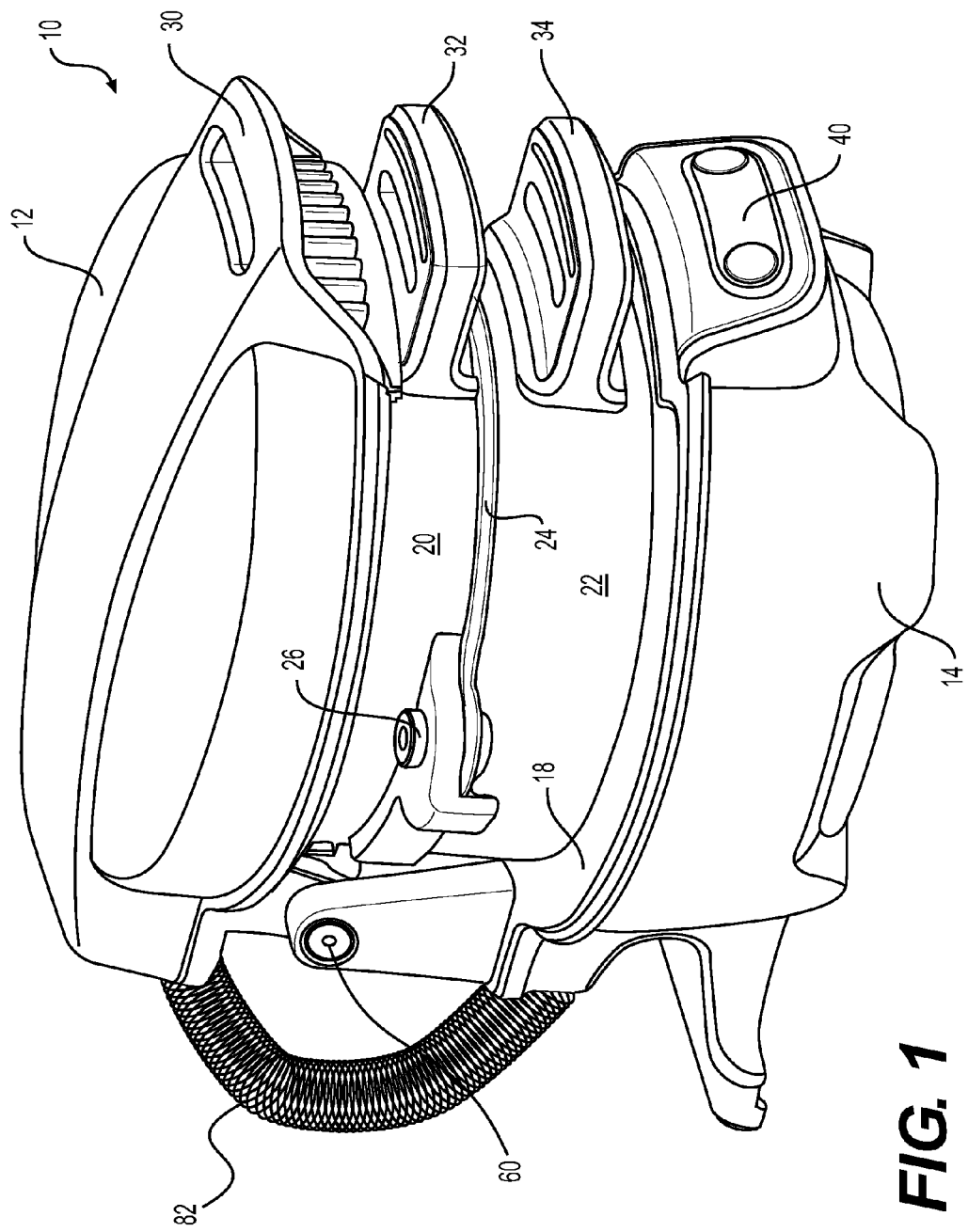
FIG. 1 is an isometric view of a sandwich making appliance, in accordance with embodiments of the present disclosure.
Figure 3:
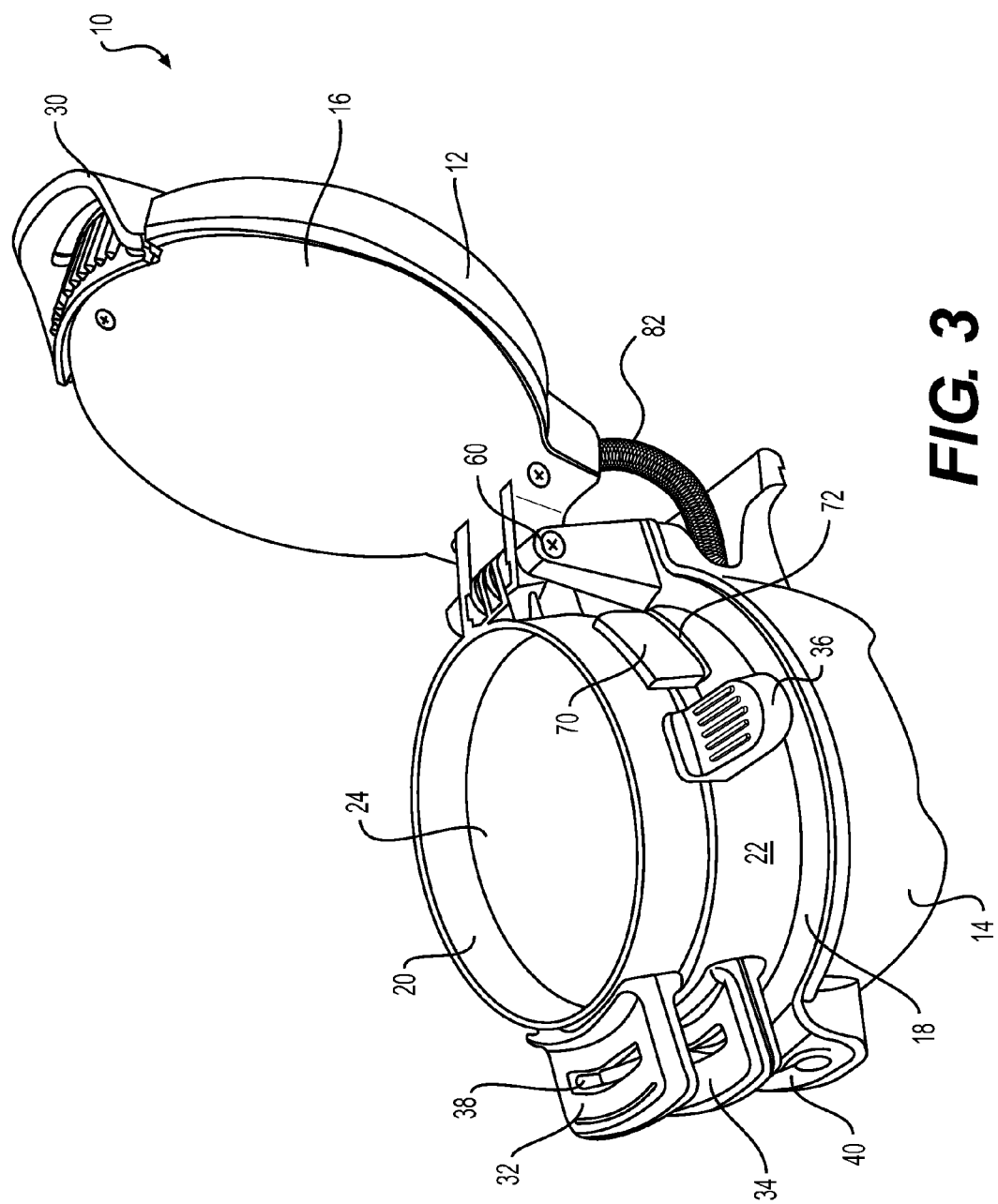
Figure 4:
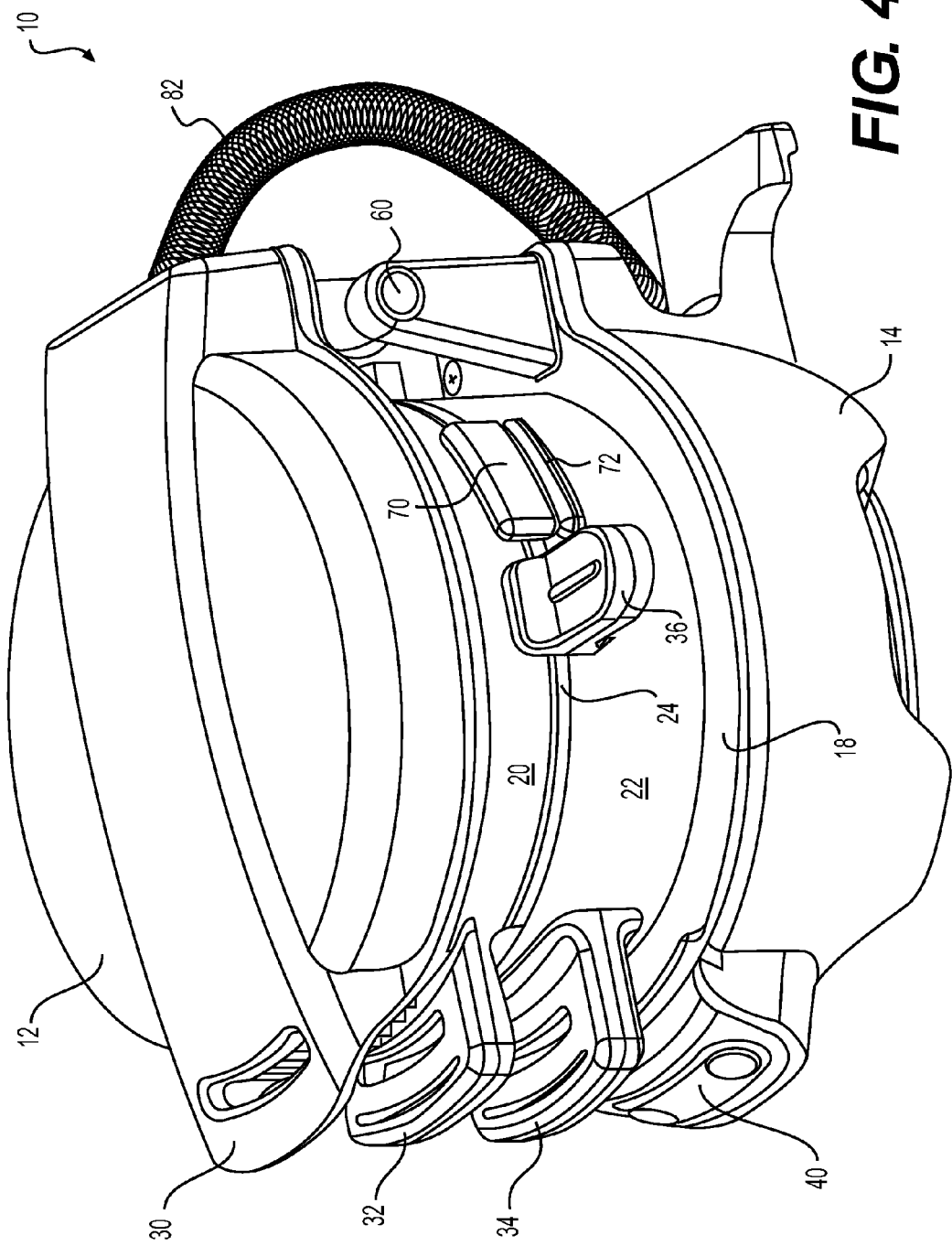
Figure 6:
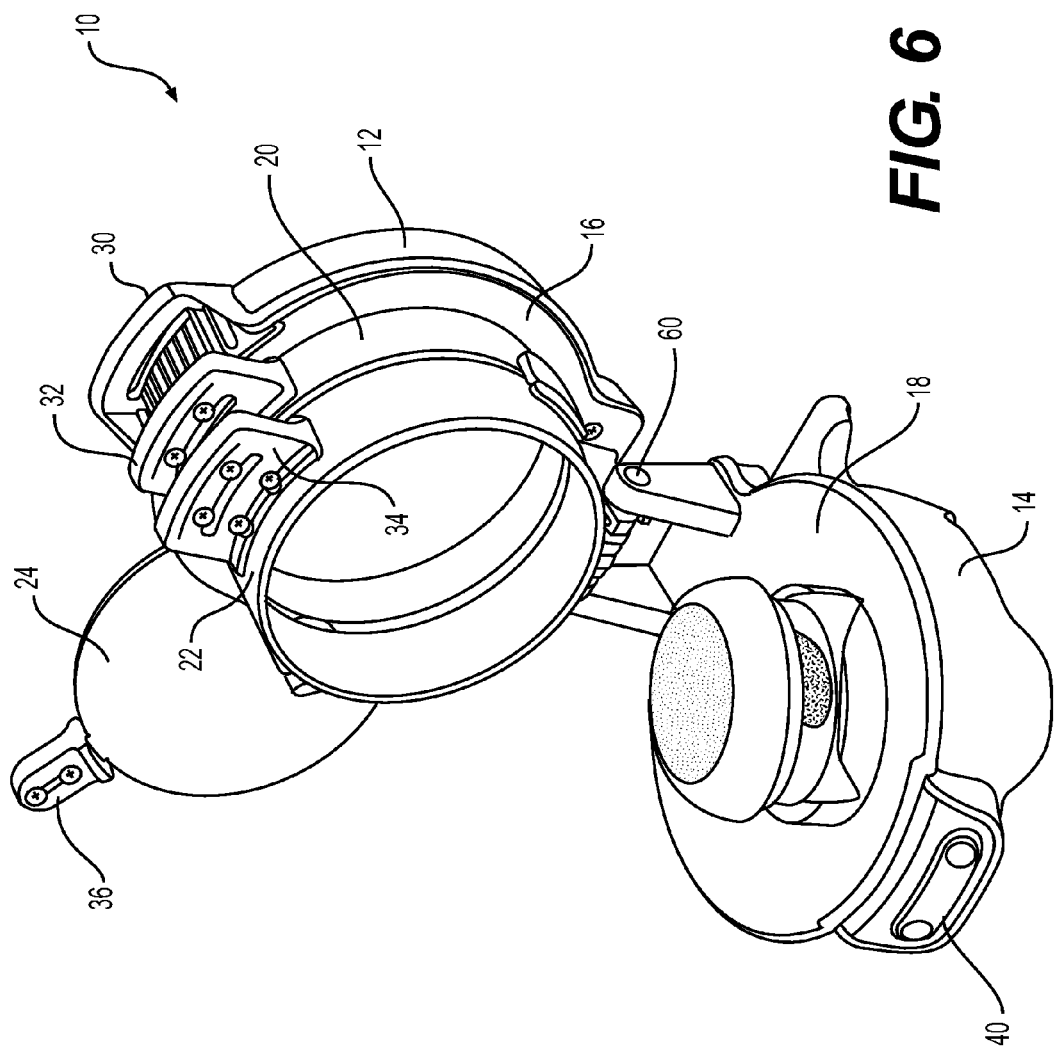

Appliance 10 further comprises a ring assembly that is positioned between the top and bottom cooking surfaces when the top housing is in the closed position. The ring assembly of the illustrated embodiment comprises top ring 20, bottom ring 22, and center cooking plate 24. In an embodiment illustrated herein, top ring 20 and bottom ring 22 are movably attached to each other (see FIG. 9). The ring assembly may be selectively movably attached to the bottom housing, such that the ring assembly is movable in its entirety between a closed position (the ring assembly being entirely closed is illustrated in FIGS. 1, 3, and 4) and an open position (the ring assembly being entirely open is illustrated in FIG. 6). In the illustrated embodiment, the ring assembly (including top ring 20 and bottom ring 22) is hingedly attached to bottom housing 14. However, any suitable movable attachment structure or method may be used to attach the ring assembly (including top ring 20 and bottom ring 22) to bottom housing 14, such as pivotal or prismatic. The ring assembly may be movable independently of the top housing. In an alternative embodiment of the disclosure, the ring assembly may sit upon the bottom cooking surface when in use and be sandwiched between the bottom and top cooking surfaces when the top housing is closed but be otherwise unattached to appliance 10.

In one embodiment, top ring 20 and bottom ring 22 are together selectively movably attached to bottom housing 14. This configuration enables top ring 20 to be movable between a closed position (see FIGS. 1, 3, 4, and 5) and an open position (illustrated in FIGS. 2 and 6). Similarly, bottom ring 22 is movable between a closed position (illustrated in FIGS. 1-5) and an open position (see FIG. 6). The top ring may be moveable independently of the top housing and independently of the bottom ring, and the bottom ring may be movable independently of the top housing and independently of the top ring. In the illustrated embodiments, all of top housing 12, top ring 20, and bottom ring 22 are hingedly attached at a common hinge point 60.

In an alternative embodiment, the top ring and the bottom ring may not be movably attached to each other but only to the bottom housing. In the alternative embodiment discussed above, in which the ring assembly is not attached to appliance 10, the top and bottom rings would not be movably attached to the bottom housing. In such an embodiment, the top and bottom rings may be movably attached to each other, may be pivotably attached to each other, may be attached to each other is any other suitable manner, or may be in contact but otherwise not be attached to each other at all. In such an embodiment in which the top and bottom rings are not attached to each other or to the bottom housing, the top ring may be stackable on the bottom ring. Appropriate guides or other structure may be present on the top and/or bottom rings to help maintain the rings in such a stacked configuration.

Figure 5:
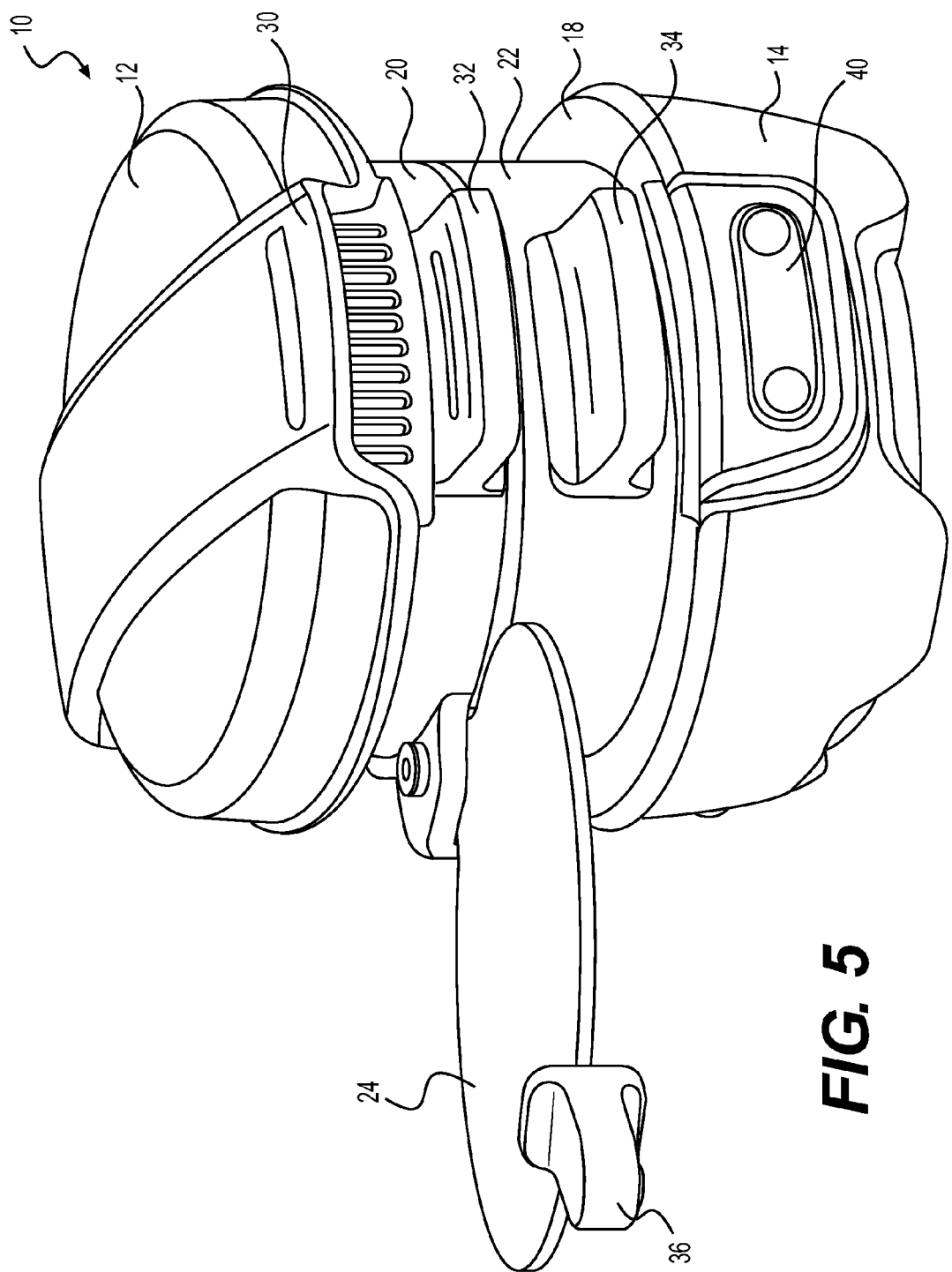

Center cooking plate 24 is movable between a closed position and an open position. Center cooking plate's closed position is most broadly defined by a position wherein center cooking plate 24 overlaps the circumference of at least one of top ring 20 or bottom ring 22 (see FIG. 2). In the closed position of center cooking plate 24, when top ring 20 and bottom ring 22 are also in their respective closed positions, center cooking plate 24 is positioned between the top and bottom rings 20, 22 (see FIGS. 1, 3 and 4). The open position of center cooking plate 24 is where center cooking plate 24 does not entirely overlap the circumference of at least top ring 20 or bottom ring 20 or where some or all of center cooking plate 24 is not positioned between the top and bottom rings 20, 22 (see FIGS. 5 and 6). In one embodiment, center cooking plate 24 is pivotably movable between its open position and its closed position. Alternatively, center cooking plate 24 may be slidably movable between its open position and its closed position. Advantageously, center cooking plate 24 is movable between its open position and its closed position while the top and bottom rings are in their respective closed positions. In the embodiment of FIG. 5, where the top and bottom rings are in their respective closed positions and the center cooking plate in its open position, center cooking plate 24 is pivotably attached to top ring 20 at a pivot point 26. It is possible to pivot center cooking plate 24 about pivot point 26 to center cooking plate's closed position without displacing top or bottom rings 20, 22. Alternatively, center cooking plate 24 may be pivotably attached to bottom ring 22 at a pivot point (not shown).

Top and bottom cooking surfaces 16, 18 selectively form, along with the ring assembly, top and bottom cooking cavities. The top cooking cavity is formed by the top cooking surface 16, the top ring 20, and the center cooking plate 24 when each are properly positioned (see, e.g., FIGS. 1 and 2). For example, the top cooking cavity exists when the top housing and the center cooking plate are in their respective closed positions. The bottom cooking cavity is formed by the bottom cooking surface 18, the bottom ring 22, and the center cooking plate 24 when each are properly positioned. For example, the bottom cooking cavity exists when the bottom ring and the center cooking plate are in their respective closed positions and the center cooking plate is positioned parallel to the bottom cooking surface (see, e.g., FIGS. 1 and 3).

Appliance 10 may comprise a handle 30 affixed to top housing 12, a handle 32 affixed to top ring 20, and a handle 34 affixed to bottom ring 22. These separate and independent handles enable a user to independently move the top housing, the top ring, and the bottom ring. Appliance 10 may further comprise a handle 36 affixed to center cooking plate 24 to enable a user to slide or pivot center cooking plate 24 relative to the top or bottom rings 20, 22. One or more of the handles 30, 32, 34, 36 may have one or more through-holes 38 defined therein to inhibit heat transfer to the portion of the handle that a user would grasp. Handles 30, 32, 34, 36 may also comprise a hollow construction to further insulate the handles. Latches (not illustrated) or other types of locking mechanisms may be included (such as in conjunction with top housing handle 30) to keep the appliance in a fully closed position during cooking.

Appliance 10 comprises display/control panel 40. Display/control panel 40 may comprise any desired combination of user input elements (e.g., buttons, switches, knobs, dials, etc.) to enable a user to control operation of appliance 10 and/or display elements (e.g., lights, alphanumeric displays, etc.) to provide information to a user. For example, display/control panel 40 may comprise a "power" light and a "preheat" light. As another example, display/control panel 40 may comprise any suitable means for turning the appliance on and off (e.g., a simple on/off switch) and/or for controlling the cooking time (e.g., a timed on/off switch). Alternatively, on/off switches and the like may be omitted and the appliance may be turned on and off simply by plugging in and unplugging the appliance from a power source. Further, display/control panel 40 may comprise a timer (electromechanical or digital) that simply times the cooking of the food item but does not control power to the appliance.

The ring assembly of appliance 10 may comprise at least one spacer element to maintain a desired spacing between the top and bottom rings. The desired spacing corresponds to the thickness of the center cooking plate. The spacing should be large enough to enable the center cooking plate to readily slide or pivot between its open position and its closed position while the top and bottom rings are in their respective closed positions and small enough to reduce the likelihood of food items (especially uncooked egg) inadvertently escaping when the center cooking plate is in its closed position. Specifically, as illustrated in FIG. 4, a spacer element top portion 70 is affixed to top ring 20 and a spacer element bottom portion 72 is affixed to bottom ring 22. The mounting positions of spacer element top portion 70 and spacer element bottom portion 72 are selected such that the portions engage when the top and bottom rings are in their closed positions and such that the desired spacing between the top and bottom rings is maintained when the center cooking plate is in its open position.

The ring assembly of appliance 10 may comprise a closed position stop guide to ensure that, when the center cooking plate is in its closed position, the center cooking plate properly overlaps a bottom open end of the top ring and a top open end of the bottom ring. Thus, the top and bottom cooking cavities are appropriately defined, and thus the likelihood of food items, such as uncooked egg or the like, inadvertently escaping when the center cooking plate is in its closed position is reduced. Spacer element top portion 70 can function as the closed position stop guide. For example, handle 36 of the center cooking plate 24 could contact spacer element top portion 70 when center cooking plate 24 is in its fully closed position.

Figure 7:
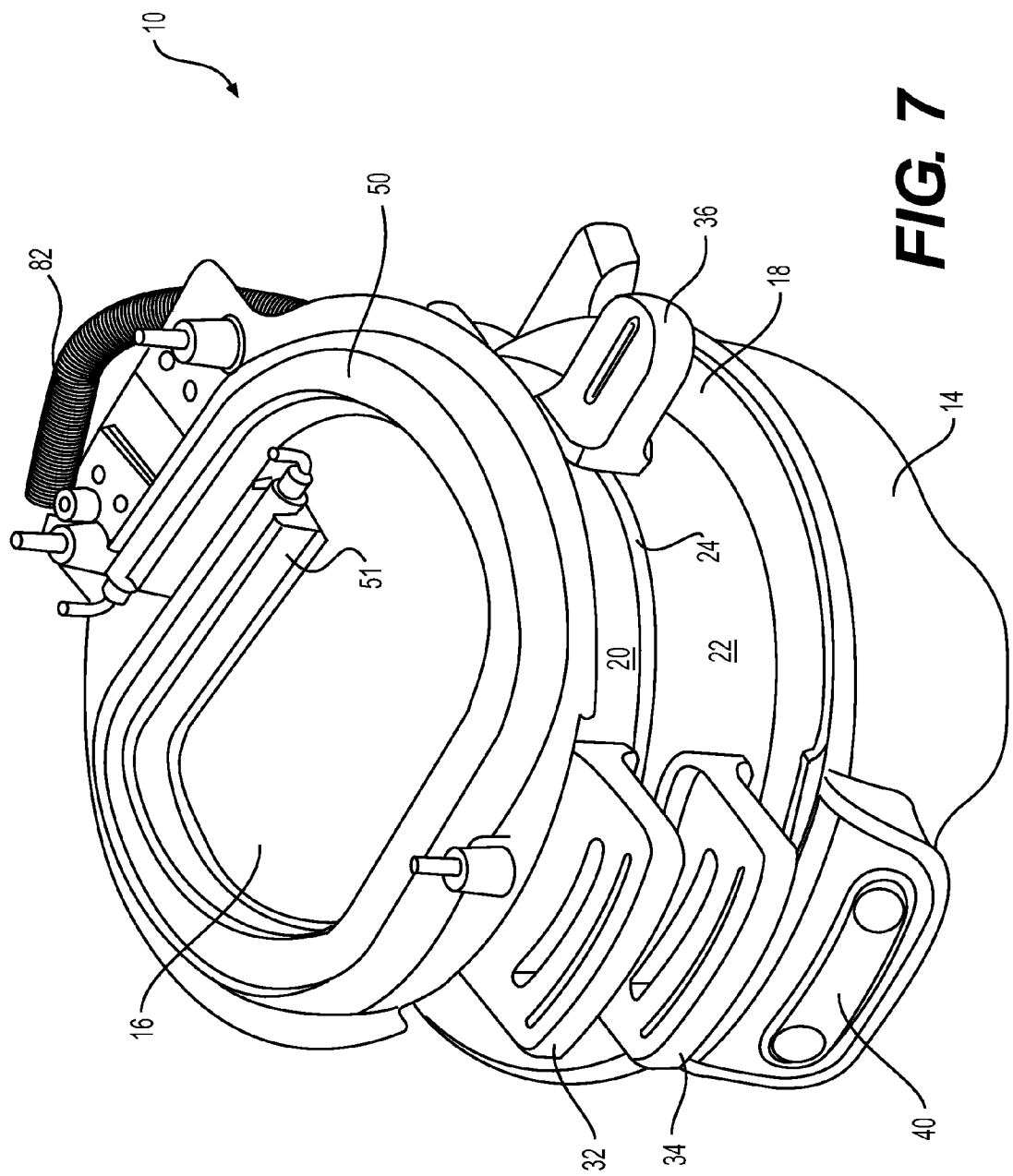
FIG. 7 is an isometric view of the sandwich making appliance of FIG. 1, with a portion of the top housing removed to illustrate internal components.

FIG. 7 is an isometric view of the sandwich making appliance of FIG. 1, with a portion of the top housing removed to illustrate internal components. Appliance 10 may comprise one or more heating elements 50 in either the top housing, the bottom housing, or both. Heating element 50 may comprise any known type of heating element, such as a resistive heating element, that is capable of heating one or more of the top cooking surface and the bottom cooking surface. Heat sink 51 may be interposed between heating element 50 and the inner surface (i.e., the surface opposite the cooking surface) of top cooking surface 16. Such a heat sink aids conductive heat transfer between heating element 50 and top cooking surface 16. In an embodiment of the disclosure in which heating elements are provided in both the top and bottom housings, similar components would reside in the bottom housing of the appliance (not illustrated).

In an embodiment of the disclosure in which heating elements are provided in both the top and bottom housings, the top heating element will conductively heat the top cooking surface and the bottom heating element will conductively heat the bottom cooking surface. When the top housing is in a closed position, contact is maintained between (i) the bottom cooking surface and the bottom ring, (ii) the bottom ring and the center cooking plate, (iii) the center cooking plate and the top ring, and (iv) the top ring and the top cooking surface. As such, conductive heat transfer occurs from the top cooking surface and/or the bottom cooking surface to the top ring, the bottom ring, and the center cooking plate.

In an embodiment of the disclosure in which heating elements are provided in both the top and bottom housings, in addition to a power cord that goes from the bottom housing to a wall electrical outlet (not illustrated) to provide electrical power to the appliance, power cord 82 routes power from the bottom housing to the top housing to supply the top heating element.

Figure 8:
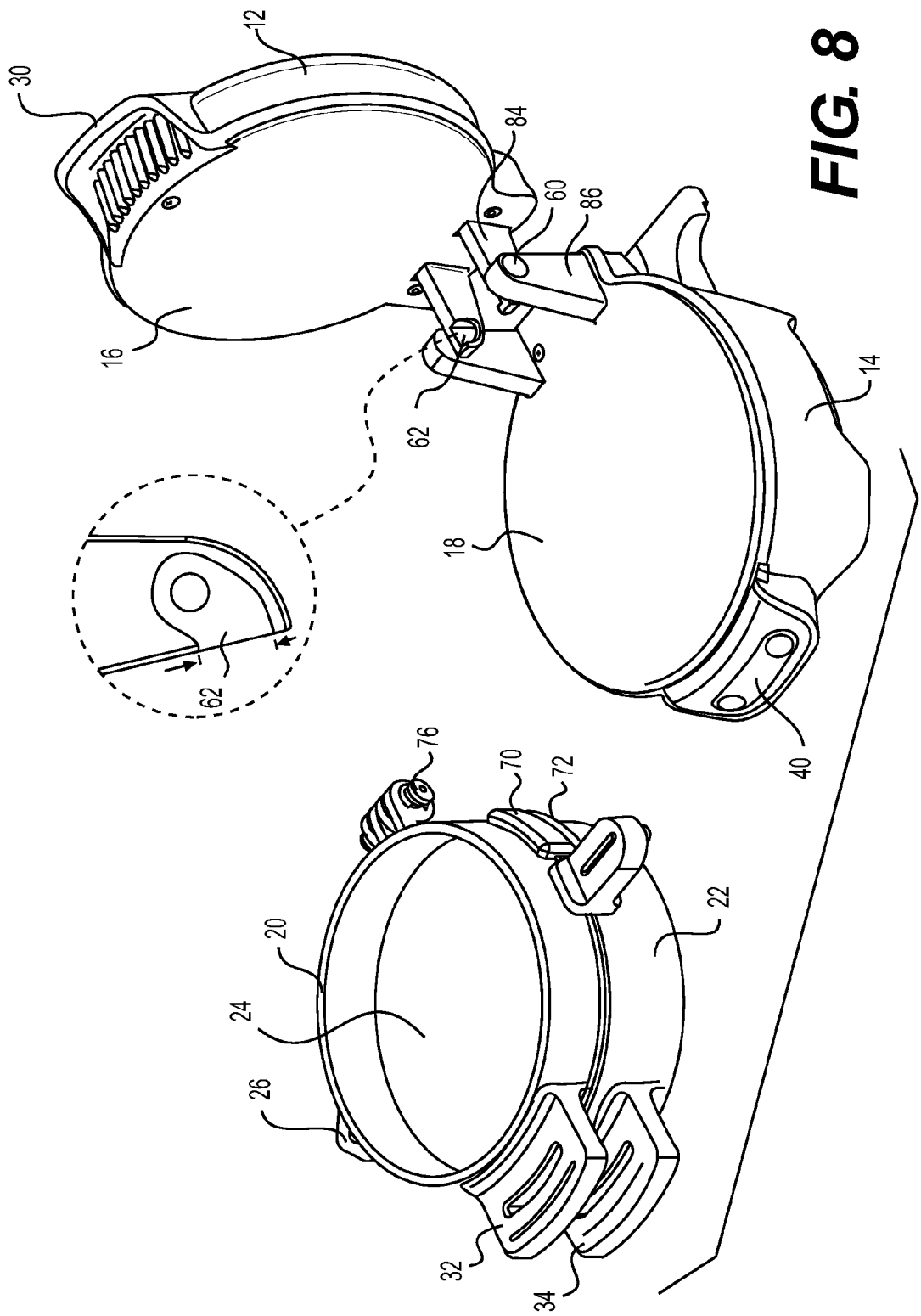
FIG. 8 is an isometric view of the sandwich making appliance of FIG. 1, with the ring assembly removed.

FIG. 8 is an isometric view of the sandwich making appliance of FIG. 1, with the ring assembly selectively removed. In this illustrated embodiment, the ring assembly is selectively removably affixed to the bottom housing and thus is removable as a unit (e.g., for cleaning) while the top housing remains movably attached to the bottom housing. Top housing 12 comprises two elongated top struts 84 that project substantially perpendicularly from top cooking surface 16. Similarly, bottom housing 14 comprises two elongated bottom struts 86 that project substantially perpendicularly from bottom cooking surface 18. Pivot point 60, about which top housing 12, top ring 20, and bottom ring 22 all commonly pivot, is formed where the distal ends of top struts 84 and bottom struts 86 meet or overlap. The elongated structure of the various struts enable the ring assembly to fit between the top and bottom housings and enables the top cooking surface to be substantially parallel to the bottom cooking surface when the top housing is in its closed position. A first hinge pin (not labeled) or similar mechanism hingedly joins the top and bottom struts on one side, and a second hinge pin (not labeled) or similar mechanism hingedly joins the top and bottom struts on the opposing side.

Top ring 20 and bottom ring 22 are hingedly attached to each other via hinge pin 76. As illustrated in FIG. 8, top struts 84 have opposing channels 62 for receiving opposing ends of hinge pin 76 therebetween when the ring assembly is selectively attached to appliance 10. Hinge pin 76 has opposing ends, each opposing end having a different diameter (see FIG. 9). The opposing channels each have a different width (the dimension described herein as the width of the channel is indicated by the arrows in the inset of FIG. 8) that correspond to one of the different diameters of the opposing ends of hinge pin 76. The different diameters of the opposing ends of hinge pin 76 and the corresponding different widths of opposing channels 62 would ensure that the ring assembly can only be attached to appliance 10 in one particular orientation, thereby ensuring the correct top/bottom orientation of the ring assembly within appliance 10.

With reference to the illustrated inset of FIG. 8, there is illustrated a close-up view of the distal end of one top strut 84, in the orientation strut 84 would be in when top housing 12 is in its closed position. As further illustrated in the inset of FIG. 8, channel 62 is angled upward when top housing 12 is in its closed position. Although not illustrated, the opposing channel has the same angle. When the ring assembly is attached to appliance 10 and top housing is in its closed position, the ends of hinge pin 76 are positioned in the upper ends of the respective channels. The ring assembly would be sandwiched between the upper and lower housings 12, 14. The ring assembly could only be removed by applying a force along a plane parallel to the top or bottom cooking surfaces 16, 18. Accordingly, if a user attempts to pull the ring assembly out of appliance 10 while top housing 12 is in its closed position (which may be while the food item is cooking), the angle of channels 62 would obstruct such movement such that that the ring assembly cannot be removed from the hinge point when the top housing is in its closed position.

Figure 9:
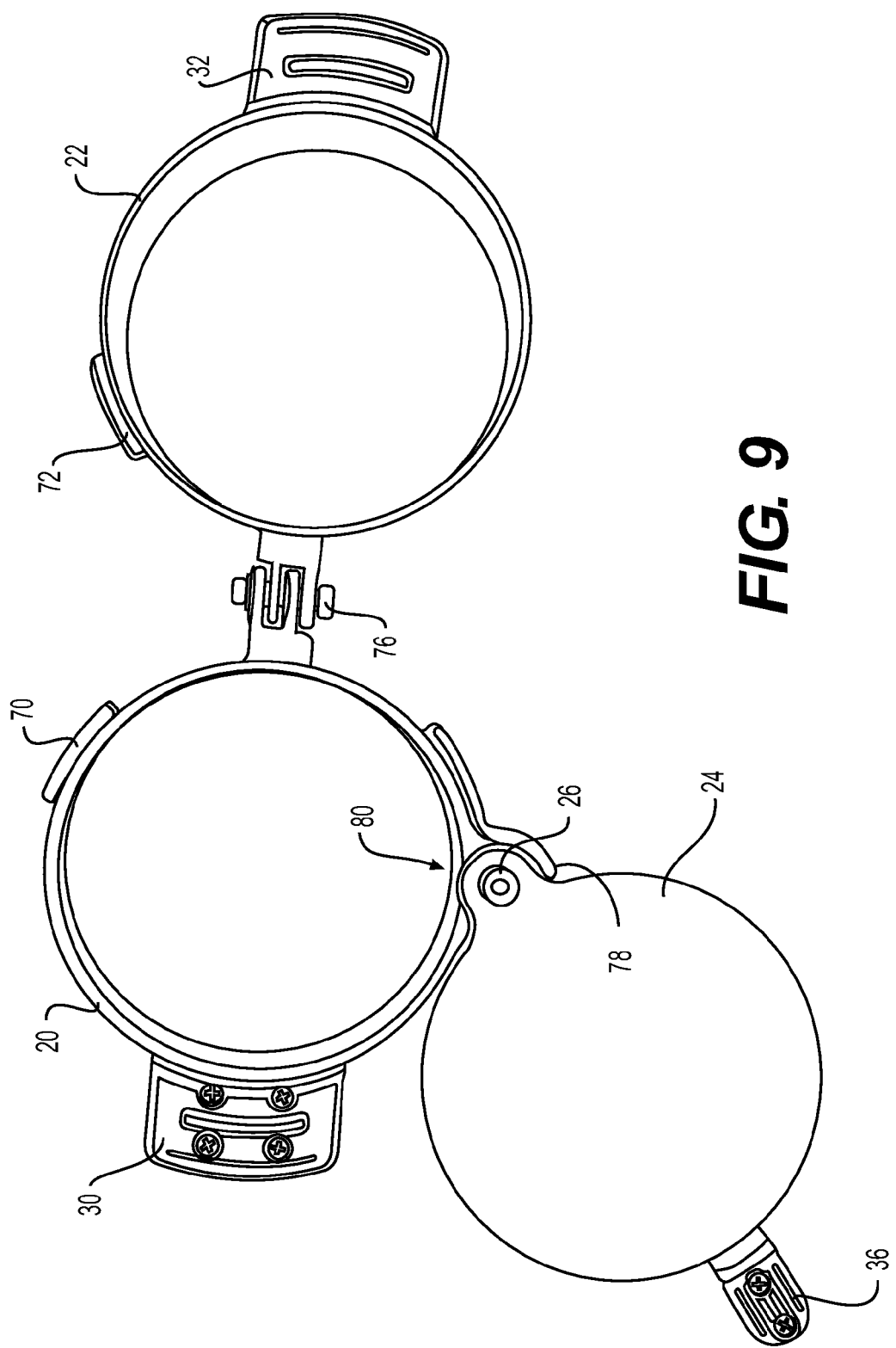
FIG. 9 is a top view of the ring assembly of the sandwich making appliance of FIG. 1, removed from the appliance.

FIG. 9 is a top view of the ring assembly only as removed from appliance 10, such as for cleaning. Top ring 20 and bottom ring 22 are open 180 degrees apart and center cooking plate 24 is pivoted open. The ring assembly may further comprise an open position stop guide 78, which is part of the structure that supports pivot point 26. Open position stop guide 78 defines and limits how far center cooking plate 24 can pivot. Specifically, open position stop guide 78 engages center cooking plate 24 to create a rotation limit. A portion of center cooking plate 24 contacts open position stop guide 78 (as illustrated in FIG. 9) such that the center cooking plate cannot pivot any further out. The size and shape of center cooking plate 24, the location of the pivot point, and the limit set by open position stop guide 78 all combine to ensure that, when center cooking plate 24 is in its open position, at least a portion of center cooking plate 24 remains between top and bottom rings 20, 22 when the rings are in their closed positions in appliance 10. This overlap, which is illustrated in FIG. 9 at 80, further helps to maintain the desired spacing between top and bottom rings 20, 22 or otherwise facilitates the ability to readily pivot center cooking plate 24 from its open position to its closed position while top and bottom rings 20, 22 are in their respective closed positions.

While top cooking surface 16 and bottom cooking surface 18 are described above as typically substantially planar, either or both of top cooking surface 16 and bottom cooking surface 18 may comprise one or more ridges, rims, bumps, or any other suitable projections to engage, respectively, with the bottom edge of bottom ring 22 and/or the top edge of top ring 20 to help restrict side-to-side or other movement of the ring assembly, especially during opening and closing of center cooking plate 24. Alternatively, either or both of top cooking surface 16 and bottom cooking surface 18 may comprise one or more channels, dimples, or any other suitable indentations to engage, respectively, with one or more corresponding ridges, rims, bumps, or other suitable projection(s) on bottom ring 22 and/or top ring 20. Such structure for engagement between the ring assembly and top and bottom cooking surfaces 16, 18 may be particularly desirable in an embodiment in which, as described above, the ring assembly is not attached to appliance 10 but merely rests on lower cooking surface 18. Further, either or both of top cooking surface 16 and bottom cooking surface 18 may be ridged or ribbed rather than planar.

The embodiments of the appliance illustrated herein has a generally round horizontal cross-sectional shape, which is well suited for preparing sandwiches made using round bread, such as English muffins and bagels. However, alternative embodiments of the appliance may have any other desirable horizontal cross-sectional shape. For example, one alternative embodiment of the appliance may have a generally square horizontal cross-sectional shape. Another alternative embodiment of the appliance may have a horizontal cross-sectional shape that resembles a standard slice of bread (i.e., three straight sides and one convex side).

A method for cooking a food item comprising a plurality of layers will now be described with reference to FIGS. 1-6. Typically, several minutes prior to beginning to cook the food item, appliance 10 is preheated. The preheating may occur with appliance 10 in the fully closed position, as illustrated in FIG. 1. Top and bottom cooking surfaces 16, 18 are heated, such as by heat element 50 of FIG. 7. When appliance 10 is in the fully closed position, heated top surface 16 and heated bottom surface 18 will transfer heat to top and bottom rings 20, 22, respectively, by way of conductive heat transfer. Top and bottom rings 20, 22 together heat the movable cooking plate 24 by way of conductive heat transfer. Appliance 10 may comprise an indicator light to indicate when the appliance has reached the desired preheat temperature. Such an indication may be based on an actual measured temperature within the appliance or may simply be time-based.

Figure 2:
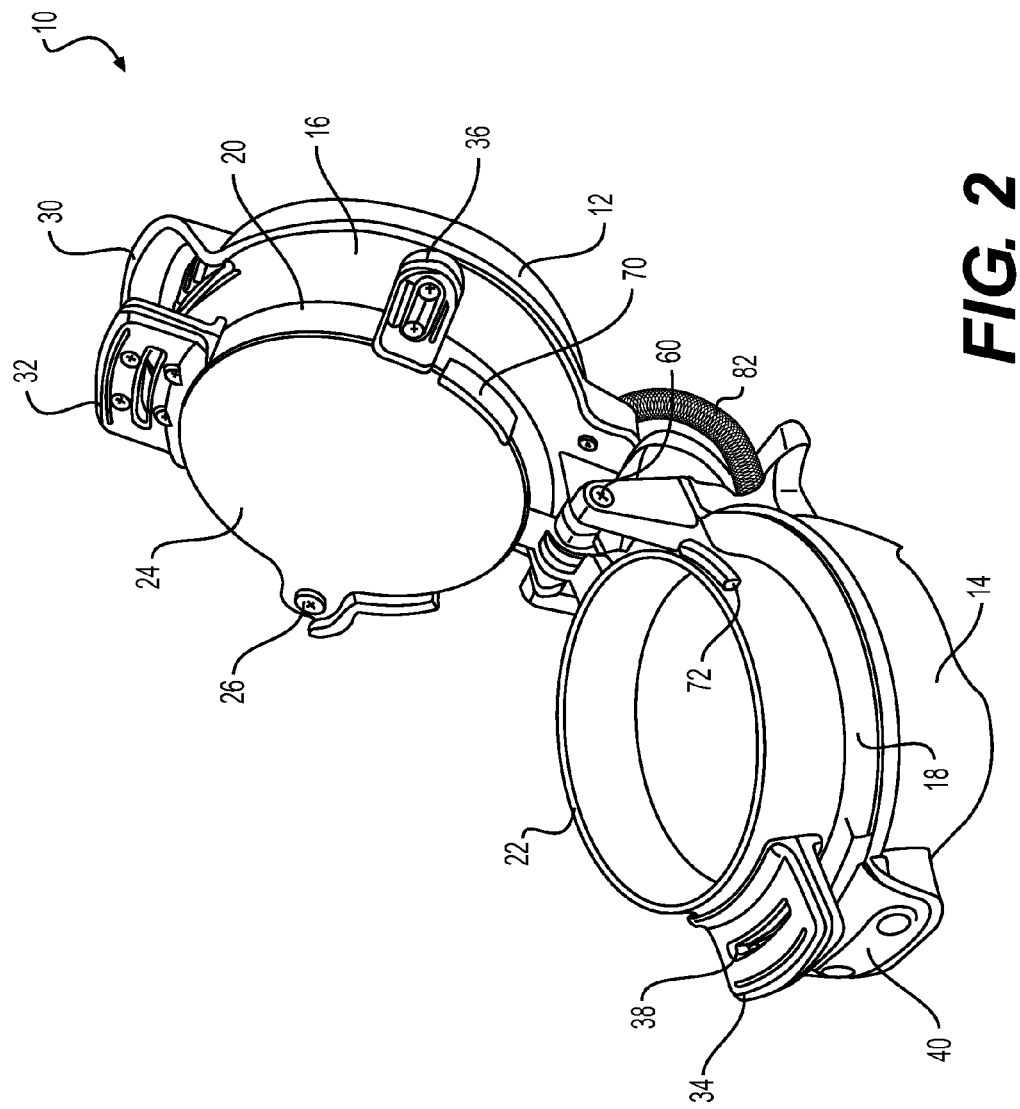
FIGS. 2-6 are isometric views of the sandwich making appliance of FIG. 1, illustrating various configurations of the appliance.

When the appliance is preheated, top housing 12 and top ring 20 are raised to their open positions and bottom ring 22 is kept closed, as illustrated in FIG. 2. A bottom layer of the food item is placed into bottom ring 22 such that the bottom layer sits on bottom cooking surface 18. Such a bottom layer may be, for example, one half of an English muffin. One or more additional layers may be placed on top of the bottom food layer. After the desired layers are placed into the bottom ring 22, top ring 20 (with the attached center cooking plate) is lowered into its closed position, as illustrated in FIG. 3. With the center cooking plate in its closed position, the bottom cooking cavity is now defined by bottom cooking surface 18, the bottom ring 22, and center cooking plate 24. Alternatively, where center cooking plate 24 is pivotally attached to bottom ring 22, the bottom cavity might be defined by rotating center cooking plate 24 to a closed position independently of lowering top ring 20.

Once center cooking plate 24 is in the closed position and top ring 20 is lowered, additional food layers may then be placed into top ring 20 such that the first additional food layer sits directly on the center cooking plate. Advantageously, because the center cooking plate is heated, this food layer may comprise a food item that requires cooking or heating, although such a food layer is not required. For example, an uncooked egg may be placed on center cooking plate 24. The heated center cooking plate can appropriately cook or heat the egg to food safe temperatures. One or more additional layers of food items may then be placed on top of the food layer that sits directly on center cooking plate 24. The top layer (i.e., the last layer to be placed into the top ring) may be, for example, the other half of the English muffin.

After all of the desired layers are placed into top ring 20, top housing 12 is lowered into its closed position, as illustrated in FIG. 4. With top housing 12 in its closed position, the top cooking cavity is now completely defined by top cooking surface 16, top ring 12, and center cooking plate 24. Appliance 10 is maintained in this fully closed position for a period of time to either toast the top or bottom layers or, if necessary, to enable any internal food item to be heated/cooked. The period of time may be predetermined, and the predetermination may be based on any one or more of several factors (e.g., the type of food item, the types and/or numbers of layers, the desired end temperature, user preferences, etc.). The appliance may track the cooking time and notify a user when the cooking time has elapsed, such as via a timer. Alternatively, a user may manually track the elapsed time from the closing of top housing 12.

After sufficient time has elapsed, center cooking plate 24 is moved to its open position in which the movable cooking plate 24 is no longer separating the top cooking cavity from the bottom cooking cavity, as illustrated in FIG. 5. Moving center cooking plate 24 from its closed position to its open position causes the layers in the top cooking cavity to separate from center cooking plate 24 such that they stack onto any food items in the bottom cooking cavity. Accordingly, the top food layers are assembled onto the food layers positioned in the bottom cooking cavity. Thus, a fully cooked sandwich is now assembled. Top housing 12, top ring 20, and bottom ring 22 are now raised into their respective open/upper positions, as illustrated in FIG. 6, such that the assembled sandwich may be readily removed from appliance 10.

[New Content Starts Here]

Figure 10:
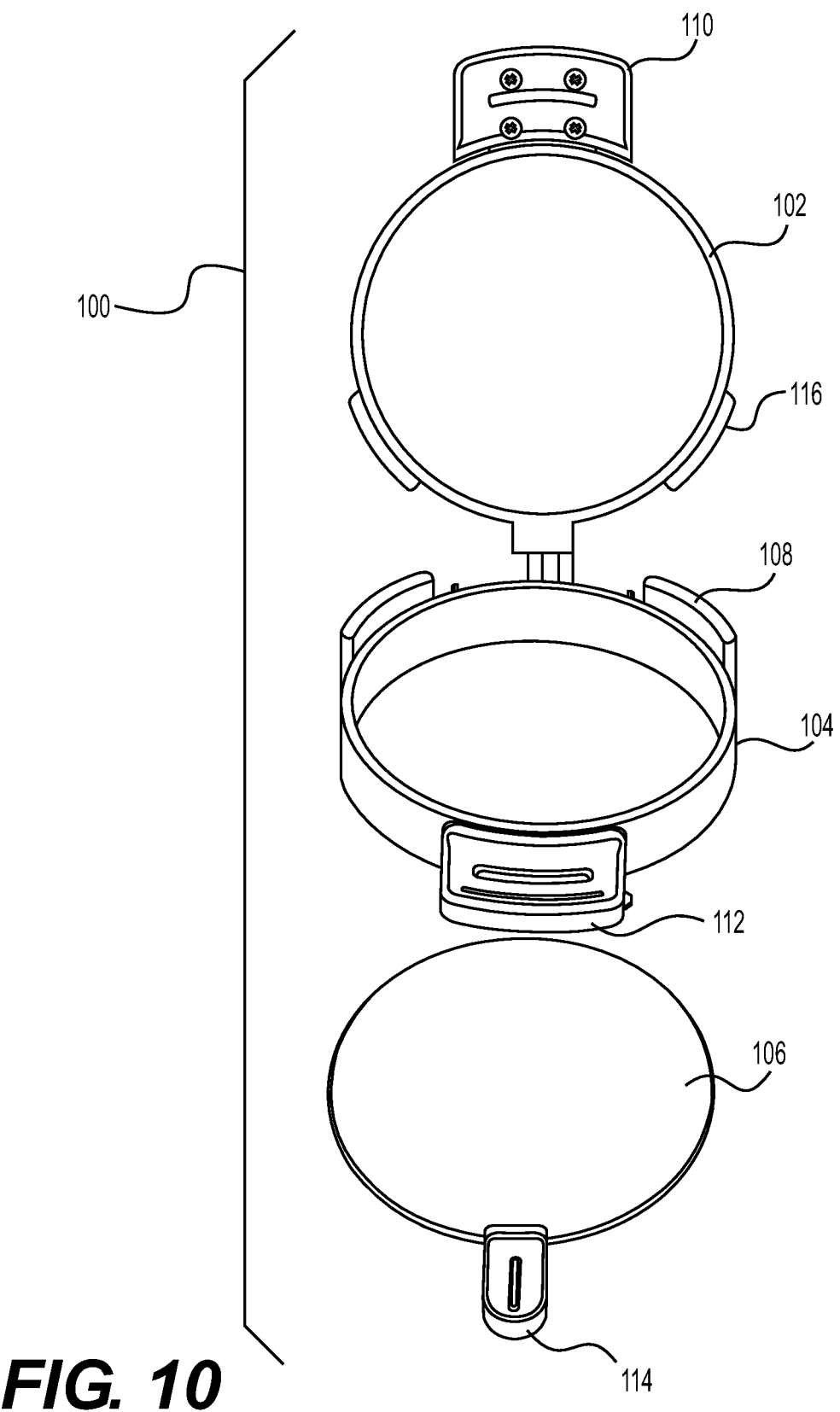
FIG. 10 is an isometric view of a ring assembly of a sandwich making appliance, removed from the appliance, in accordance with alternative embodiments of the present disclosure.

Referring now to FIG. 10, an isometric view of a ring assembly of a sandwich making appliance is illustrated in accordance with alternative embodiments of the present disclosure. The ring assembly 100 of FIG. 10 is shown removed from its sandwich making appliance for clarity. The sandwich making appliance that would comprise ring assembly 100 of FIG. 10 is similar to the sandwich making appliance of FIGS. 1-9 in that it comprises a bottom housing and a top housing. The bottom housing has a top surface that forms a bottom cooking surface of the appliance. The top housing has a bottom surface that forms a top cooking surface of the appliance. The top housing is movably attached to the bottom housing. The top housing is moveable between a closed position and an open position. Ring assembly 100 is positioned between the top and bottom cooking surfaces when the top housing is in its closed position.

Ring assembly 100 of FIG. 10 is similar to the ring assembly of FIGS. 1-9. However, the ring assembly of FIG. 10 has a center cooking plate that is removable from the ring assembly. Ring assembly 100 comprises top ring 102, bottom ring 104, and center cooking plate 106. Top ring 102 and bottom ring 104 are together selectively movably attached to the bottom housing (not illustrated) of the cooking appliance. This configuration enables top ring 102 to be movable between a closed position and an open position. Similarly, bottom ring 104 is movable between a closed position and an open position. The top ring may be moveable independently of the top housing and independently of the bottom ring, and the bottom ring may be movable independently of the top housing and independently of the top ring.

Center cooking plate 106 is adapted to be removably inserted between top ring 102 and bottom ring 104. Center cooking plate 106 may be removably inserted between top ring 102 and bottom ring 104 while the top and bottom rings are in their respective closed positions. When inserted, center cooking plate 106 is positioned such that center cooking plate 106 overlaps the circumference of at least one of top ring 102 or bottom ring 104. Center cooking plate 106 defines top and bottom cooking cavities when center cooking plate 104 is inserted between top ring 102 and bottom ring 104. The top cooking cavity is formed by the top cooking surface (not illustrated) of the appliance, top ring 102, and center cooking plate 106 when the top housing is in its closed position and when center cooking plate 106 is inserted between top ring 102 and bottom ring 104. The bottom cooking cavity is formed by the bottom cooking surface (not illustrated) of the appliance, bottom ring 104, and center cooking plate 106 when the top housing is in its closed position and when center cooking plate 106 is inserted between top ring 102 and bottom ring 104.

Ring assembly 100 further comprises one or more stop guides 108. Center cooking plate 106 engages stop guides 108 when center cooking plate 106 is inserted between top ring 102 and bottom ring 104. When center cooking plate 106 engages both stop guides 108, center cooking plate 106 is ensured to be in its correct inserted position.

Ring assembly 100 further comprises one or more spacer elements 116 to maintain a desired spacing between the top and bottom rings when the top and bottom rings are in their respective closed positions. In ring assembly 100, each spacer element 116 engages with a respective one of stop guides 108 when the top and bottom rings are in their respective closed positions.

Ring assembly 100 further comprises handles 110 and 112 affixed, respectively, to each of top ring 102 and bottom ring 104 to enable a user to independently move the top and bottom rings. Ring assembly 100 further comprises handle 114 affixed to center cooking plate 106 to enable a user to insert and remove center cooking plate 106.

The operation of an appliance with ring assembly 100 is similar to that of the appliance of FIGS. 1-9. A bottom layer of a food item is placed into bottom ring 104 such that the bottom layer sits on the bottom cooking surface. Such a bottom layer may be, for example, one half of an English muffin. One or more additional layers may be placed on top of the bottom food layer. After the desired layers are placed into the bottom ring 104, top ring 102 is lowered into its closed position and center cooking plate 106 is inserted into the ring assembly. Additional food layers may then be placed into top ring 102 such that the first additional food layer (such as an uncooked egg) sits directly on center cooking plate 106. One or more additional layers of food items may then be placed on top of the food layer that sits directly on center cooking plate 106. The top layer (i.e., the last layer to be placed into the top ring) may be, for example, the other half of the English muffin.

After all of the desired layers are placed into top ring 102, the top housing is lowered into its closed position. The appliance is maintained in this fully closed position for a period of time to either toast the top or bottom layers or, if necessary, to enable any internal food item to be heated/cooked. After sufficient time has elapsed, center cooking plate 106 is removed such that it is no longer separating the top cooking cavity from the bottom cooking cavity. Removing center cooking plate 106 from ring assembly 100 causes the layers in the top cooking cavity to separate from center cooking plate 106 such that they stack onto any food items in the bottom cooking cavity. Accordingly, the top food layers are assembled onto the food layers positioned in the bottom cooking cavity. Thus, a fully cooked sandwich is now assembled. Top housing, top ring 102, and bottom ring 104 are now raised into their respective open/upper positions, such that the assembled sandwich may be readily removed from the appliance.

Figure 11:
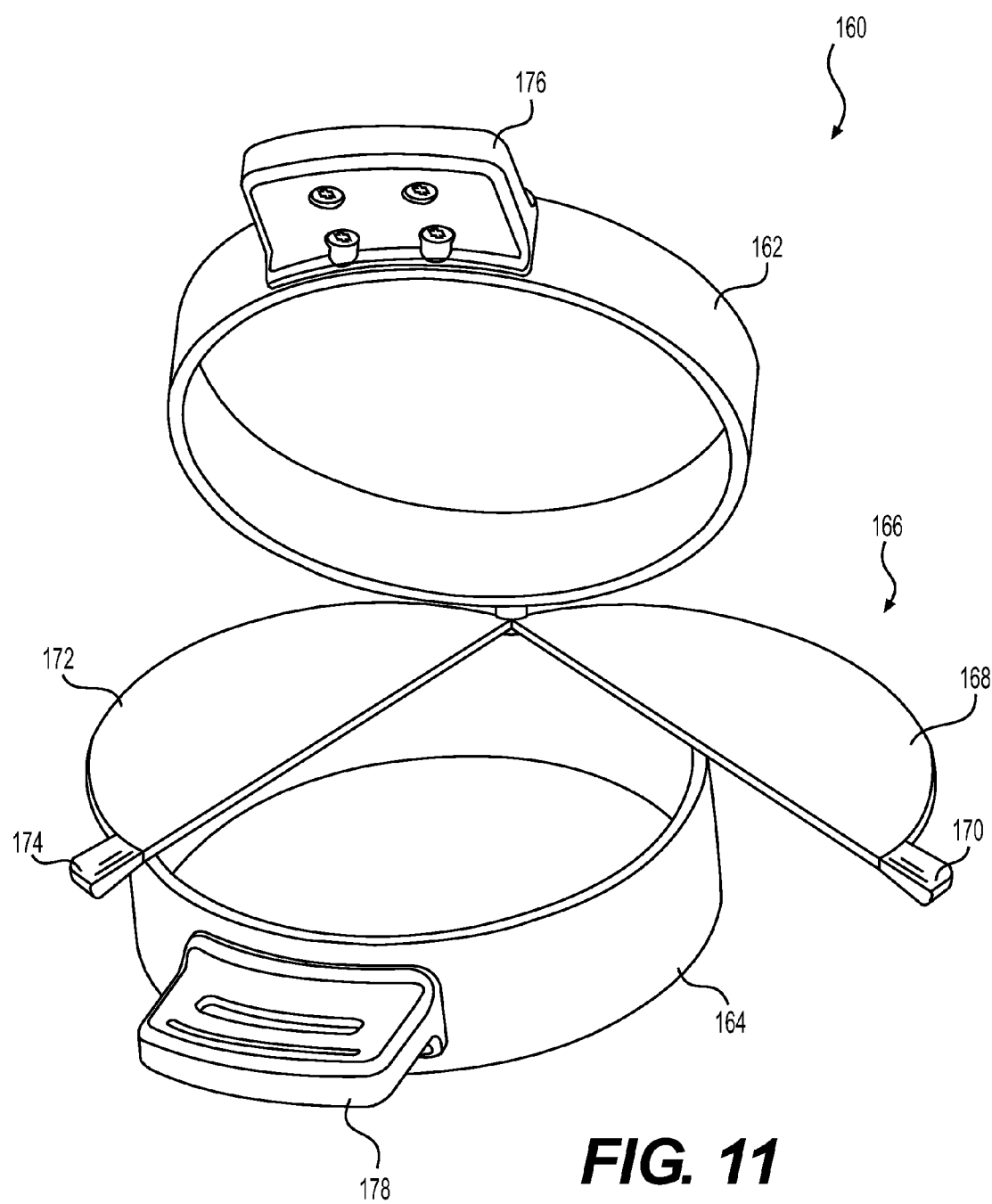
FIG. 11 is an isometric view of a ring assembly of a sandwich making appliance, removed from the appliance, in accordance with alternative embodiments of the present disclosure.

Referring now to FIG. 11, an isometric view of a ring assembly of a sandwich making appliance is illustrated in accordance with alternative embodiments of the present disclosure. The ring assembly 160 of FIG. 11 is shown removed from its sandwich making appliance for clarity. The sandwich making appliance that would comprise ring assembly 160 of FIG. 11 is similar to the sandwich making appliance of FIGS. 1-9 in that it comprises a bottom housing and a top housing. The bottom housing has a top surface that forms a bottom cooking surface of the appliance. The top housing has a bottom surface that forms a top cooking surface of the appliance. The top housing is movably attached to the bottom housing. The top housing is moveable between a closed position and an open position. Ring assembly 160 is positioned between the top and bottom cooking surfaces when the top housing is in its closed position.

Ring assembly 160 of FIG. 11 is similar to the ring assembly of FIGS. 1-9. However, the ring assembly of FIG. 11 has a center cooking plate that is split into two independently movable sections. Ring assembly 160 comprises top ring 162, bottom ring 164, and center cooking plate 166. Top ring 162 and bottom ring 164 are together selectively movably attached to the bottom housing (not illustrated) of the cooking appliance. This configuration enables top ring 162 to be movable between a closed position and an open position. Similarly, bottom ring 164 is movable between a closed position and an open position. The top ring may be moveable independently of the top housing and independently of the bottom ring, and the bottom ring may be movable independently of the top housing and independently of the top ring.

Center cooking plate 166 comprises left portion 172 and right portion 168 that are movable in relation to each other. Left portion 172 and right portion 168 of center cooking plate 166 are pivotably movable in relation to each other. Left portion 172 and right portion 168 are movable between a closed position in which the left and right portions abut each other and an open position in which the left and right portions are a maximum distance apart. FIG. 11 illustrates a partially open position. The left and right portions of the center cooking plate are moveable while the top and bottom rings are in their respective closed positions.

Center cooking plate 166 defines top and bottom cooking cavities when left portion 172 and right portion 168 of center cooking plate 166 are in their closed position. The top cooking cavity is formed by the top cooking surface (not illustrated) of the appliance, top ring 162, and center cooking plate 166 when the top housing is in its closed position and when left portion 172 and right portion 168 of center cooking plate 166 are in their closed position. The bottom cooking cavity is formed by the bottom cooking surface (not illustrated) of the appliance, bottom ring 164, and center cooking plate 166 when the top housing is in its closed position and when left portion 172 and right portion 168 of center cooking plate 166 are in their closed position. Regardless of what position left portion 172 and right portion 168 are in, at least a portion of left portion 172 and/or right portion 168 will typically remain between the top and bottom rings while the top and bottom rings are in their respective closed positions to ensure proper spacing between top ring 162 and bottom ring 164.

Ring assembly 160 further comprises handles 176 and 178 affixed, respectively, to each of top ring 162 and bottom ring 164 to enable a user to independently move the top and bottom rings. Ring assembly 160 further comprises left handle 174 and right handle 170 affixed, respectively, to left portion 172 and right portion 168 of center cooking plate 166 to enable a user to independently move left portion 172 and right portion 168.

The operation of an appliance with ring assembly 160 is similar to that of the appliance of FIGS. 1-9. A bottom layer of a food item is placed into bottom ring 164 such that the bottom layer sits on the bottom cooking surface. Such a bottom layer may be, for example, one half of an English muffin. One or more additional layers may be placed on top of the bottom food layer. After the desired layers are placed into the bottom ring 164, top ring 162 is lowered into its closed position and left portion 172 and right portion 168 of center cooking plate 166 are moved together (if not already). Additional food layers may then be placed into top ring 162 such that the first additional food layer (such as an uncooked egg) sits directly on center cooking plate 166. One or more additional layers of food items may then be placed on top of the food layer that sits directly on center cooking plate 166. The top layer (i.e., the last layer to be placed into the top ring) may be, for example, the other half of the English muffin.

After all of the desired layers are placed into top ring 162, the top housing is lowered into its closed position. The appliance is maintained in this fully closed position for a period of time to either toast the top or bottom layers or, if necessary, to enable any internal food item to be heated/cooked. After sufficient time has elapsed, left portion 172 and right portion 168 of center cooking plate 166 are moved apart such that center cooking plate 166 is no longer separating the top cooking cavity from the bottom cooking cavity. Moving left portion 172 and right portion 168 apart causes the layers in the top cooking cavity to separate from center cooking plate 166 such that they stack onto any food items in the bottom cooking cavity. Accordingly, the top food layers are assembled onto the food layers positioned in the bottom cooking cavity. Thus, a fully cooked sandwich is now assembled. Top housing, top ring 162, and bottom ring 164 are now raised into their respective open/upper positions, such that the assembled sandwich may be readily removed from the appliance.

Figure 12:
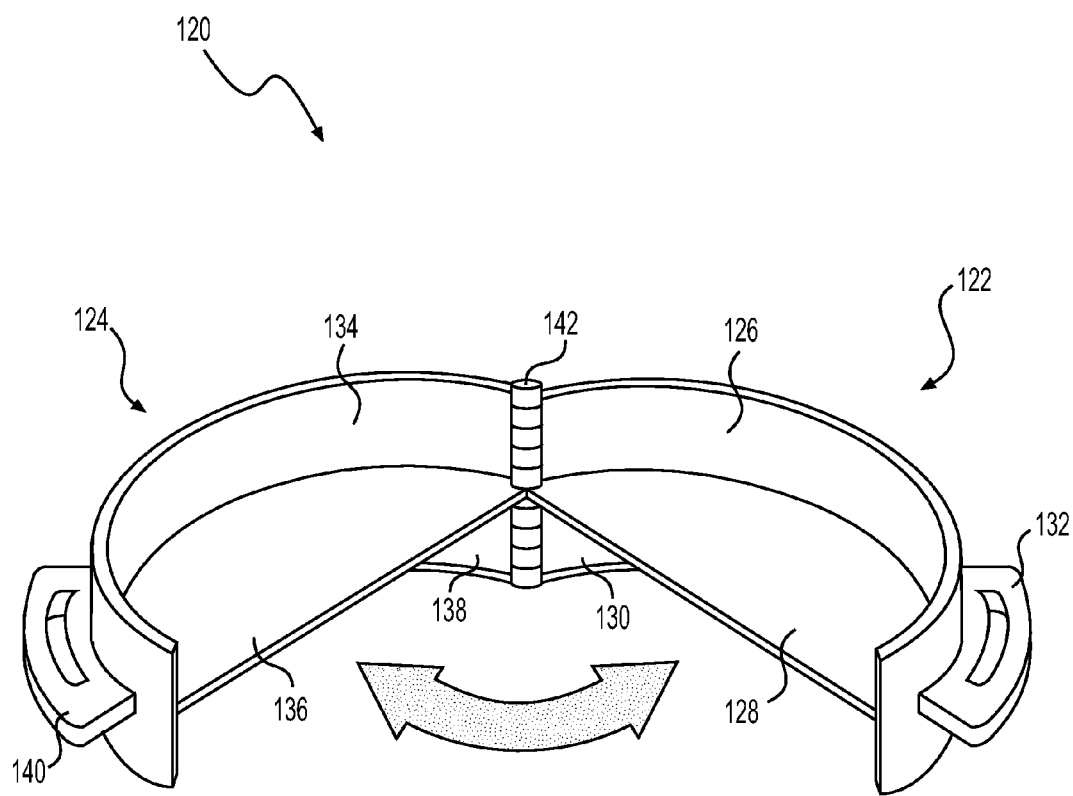
FIG. 12 is an isometric view of a ring assembly of a sandwich making appliance, removed from the appliance, in accordance with alternative embodiments of the present disclosure.

Referring now to FIG. 12, an isometric view of a ring assembly of a sandwich making appliance is illustrated in accordance with alternative embodiments of the present disclosure. The ring assembly 120 of FIG. 11 is shown removed from its sandwich making appliance for clarity. The sandwich making appliance that would comprise ring assembly 120 of FIG. 12 is similar to the sandwich making appliance of FIGS. 1-9 in that it comprises a bottom housing and a top housing. The bottom housing has a top surface that forms a bottom cooking surface of the appliance. The top housing has a bottom surface that forms a top cooking surface of the appliance. The top housing is movably attached to the bottom housing. The top housing is moveable between a closed position and an open position. Ring assembly 120 is positioned between the top and bottom cooking surfaces when the top housing is in its closed position.

Ring assembly 120 of FIG. 12 is quite different from the ring assembly of FIGS. 1-9. Ring assembly 120 comprises a unitary left ring assembly portion 124 and a unitary right ring assembly portion 122. The left ring assembly portion 124 comprises a top portion 134, a bottom portion 138, and a center cooking plate portion 136 therebetween. Top portion 134 and bottom portion 138 each comprise a semi-circular portion of a ring. Center cooking plate portion 136 comprises a semi-circular portion of a planar plate. Top portion 134, bottom portion 138, center cooking plate portion 136 are unitary and therefore are movable in unison.

The right ring assembly portion 122 comprises a top portion 126, a bottom portion 130, and a center cooking plate portion 128 therebetween. Top portion 126 and bottom portion 130 each comprise a semi-circular portion of a ring. Center cooking plate portion 128 comprises a semi-circular portion of a planar plate. Top portion 126, bottom portion 130, center cooking plate portion 128 are unitary and therefore are movable in unison.

Left ring assembly portion 124 and right ring assembly portion 122 are movable in relation to each other and to the top and bottom housings. Left ring assembly portion 124 and right ring assembly portion 122 are pivotably affixed to each other at pivot point 142, such that left ring assembly portion 124 and right ring assembly portion 122 are pivotably movable toward each other and away from each other.

Left ring assembly portion 124 and right ring assembly portion 122 are movable between a closed position in which the left and right assembly portions abut each other and an open position in which the left and right assembly portions are a maximum distance apart. FIG. 12 illustrates a partially open position. The left and right assembly portions are moveable while the top housing is in its closed position. When the left and right assembly portions abut each other, the top portion 134 of the left ring assembly portion 124 and the top portion 126 of the right ring assembly portion 122 together form a top ring. Similarly, when the left and right assembly portions abut each other, the bottom portion 138 of the left ring assembly portion 124 and the bottom portion 130 of the right ring assembly portion 122 together form a bottom ring. Further, when the left and right assembly portions abut each other, the two center cooking plate portions 136, 128 together form a center cooking plate.

A top cooking cavity is formed by the top cooking surface, the top portion 134 of the left ring assembly portion 124, the top portion 126 of the right ring assembly portion 122, and the two center cooking plate portions 136, 128, when the left ring assembly portion 124 and right ring assembly portion 122 are in the closed position. A bottom cooking cavity is formed by the bottom cooking surface, the bottom portion 138 of the left ring assembly portion 124, the bottom portion 130 of the right ring assembly portion 122, and the two center cooking plate portions 136, 128, when the left ring assembly portion 124 and right ring assembly portion 122 are in the closed position.

Ring assembly 120 further comprises handles 140 and 132 affixed, respectively, to each of left ring assembly portion 124 and right ring assembly portion 122 to enable a user to independently move the left and right ring assembly portions.

The operation of an appliance with ring assembly 120 is a bit different than that of the appliance of FIGS. 1-9. A bottom layer of a food item is placed onto the bottom cooking surface. Such a bottom layer may be, for example, one half of an English muffin. One or more additional layers may be placed on top of the bottom food layer. After the desired layers are placed onto the bottom cooking surface, left ring assembly portion 124 and right ring assembly portion 122 are moved into a closed position abutting each other, thereby forming the bottom and top rings and enclosing the food layers on the bottom cooking surface into the bottom cooking cavity. An additional food layer may then be placed onto the abutting two center cooking plate portions 136, 128. One or more additional layers of food items may then be placed on top of the food layer that sits directly on the abutting two center cooking plate portions 136, 128. The top layer (i.e., the last layer to be placed into the top ring) may be, for example, the other half of the English muffin.

After all of the desired layers are placed into top ring, the top housing is lowered into its closed position. The appliance is maintained in this fully closed position for a period of time to either toast the top or bottom layers or, if necessary, to enable any internal food item to be heated/cooked. After sufficient time has elapsed, left ring assembly portion 124 and right ring assembly portion 122 are moved apart. Moving left ring assembly portion 124 and right ring assembly portion 122 apart causes the layers in the top cooking cavity to separate from the center cooking plate such that they stack onto any food items in the bottom cooking cavity. Accordingly, the top food layers are assembled onto the food layers positioned in the bottom cooking cavity. Thus, a fully cooked sandwich is now assembled.

Referring now to FIGS. 13A-B, in which are isometric views of a sandwich making appliance are illustrated in accordance with alternative embodiments of the present disclosure. The sandwich making appliance of FIGS. 13A-B comprises a bottom housing 328 and a top housing 326. Bottom housing 328 has a top surface (not labeled) that forms a bottom cooking surface of the appliance. Top housing 326 has a bottom surface (not labeled) that forms a top cooking surface of the appliance. Top housing 326 is movably attached to bottom housing 328. The top housing is moveable between a closed position and an open position. Ring assembly 320 is positioned between the top and bottom cooking surfaces when the top housing is in its closed position.

Ring assembly 320 of FIGS. 13A-B is similar to ring assembly 120 of FIG. 12. Ring assembly 320 comprises a unitary left ring assembly portion 324 and a unitary right ring assembly portion 322. As in ring assembly 120 of FIG. 12, each of left ring assembly portion 324 and right ring assembly 322 comprises a top portion, a bottom portion, and a center cooking plate portion therebetween. The top portion and the bottom portion each comprise a semi-circular portion of a ring. The center cooking plate portion comprises a semi-circular portion of a planar plate. The top portion, the bottom portion, and the center cooking plate portion of each of left ring assembly portion 324 and right ring assembly portion 322 are unitary and therefore are movable in unison. Left ring assembly portion 124 and right ring assembly portion 122 are movable in relation to each other and to the top and bottom housings.

Unlike ring assembly 120 of FIG. 12, left ring assembly portion 324 and right ring assembly 322 of ring assembly 320 are not pivotably movable. Rather, left ring assembly portion 324 and right ring assembly portion 322 of ring assembly 320 are each affixed to a rack and pinion mechanism such that left ring assembly portion 324 and right ring assembly portion 322 are linearly movable toward each other and away from each other. The rack and pinion gear arrangement shown in FIGS. 13A-B cause left ring assembly portion 324 and right ring assembly portion 322 to move in unison (either toward each other or away from each other). Left ring assembly portion 324 is affixed on opposing sides to a left front rack gear 334*a* and a left rear rack gear 334*b*. Similarly, right ring assembly portion 322 is affixed on opposing sides to a right front rack gear 336*a* and a right rear rack gear 336*b*. Left front rack gear 334*a* and right front rack gear 336*a* both engage with front pinion gear (not visible in FIGS. 13A-B) mounted on front pinion gear support 330*a*. Left rear rack gear 334*b* and right rear rack gear 336*b* both engage with rear pinion gear 332 mounted on rear pinion gear support 330*b*.

The operation of an appliance with ring assembly 320 is similar to that of an appliance with ring assembly 120 of FIG. 12. A bottom layer of a food item is placed onto the bottom cooking surface. Such a bottom layer may be, for example, one half of an English muffin. One or more additional layers may be placed on top of the bottom food layer. After the desired layers are placed onto the bottom cooking surface, left ring assembly portion 324 and right ring assembly portion 322 are moved into a closed position abutting each other, thereby forming the bottom and top rings and enclosing the food layers on the bottom cooking surface into the bottom cooking cavity. An additional food layer may then be placed onto the abutting two center cooking plate portions. One or more additional layers of food items may then be placed on top of the food layer that sits directly on the abutting two center cooking plate portions. The top layer (i.e., the last layer to be placed into the top ring) may be, for example, the other half of the English muffin.

After all of the desired layers are placed into top ring, the top housing is lowered into its closed position. The appliance is maintained in this fully closed position for a period of time to either toast the top or bottom layers or, if necessary, to enable any internal food item to be heated/cooked. After sufficient time has elapsed, left ring assembly portion 324 and right ring assembly portion 322 are moved apart. Moving left ring assembly portion 324 and right ring assembly portion 322 apart causes the layers in the top cooking cavity to separate from the center cooking plate such that they stack onto any food items in the bottom cooking cavity. Accordingly, the top food layers are assembled onto the food layers positioned in the bottom cooking cavity. Thus, a fully cooked sandwich is now assembled.

In embodiments of the disclosure described above, one or more additional layers of food items may then be placed on top of the food layer that has been placed directly on the center cooking plate. The food layer that has been placed directly on the center cooking plate is often an uncooked egg. A user may not desire to place a food layer directly on top of an uncooked egg, especially if the food layer to be placed on top of the uncooked egg is a bread item (e.g., the top half of an English muffin). Such a bread item placed directly on top of an uncooked egg may absorb some of the uncooked egg prior to cooking, which may cause the cooked sandwich to have undesirable properties (e.g., texture). For this reason, it may be desirable to elevate one or more food layers (such as a bread item) to keep the elevated item(s) physically separated from the item below until the cooking is complete and the sandwich is ready to be assembled. The ring assemblies and/or sandwich making appliances of FIGS. 14-19 comprise a food item supporting/elevating mechanism that selectively supports a first food item above a second food item when the second food item is in the top cooking cavity.

Referring now to FIG. 14, an isometric view of a ring assembly of a sandwich making appliance is illustrated in accordance with alternative embodiments of the present disclosure. The ring assembly 200 of FIG. 14 is shown removed from its sandwich making appliance for clarity. The sandwich making appliance that would comprise ring assembly 200 of FIG. 14 is similar to the sandwich making appliance of FIGS. 1-9 in that it comprises a bottom housing and a top housing. The bottom housing has a top surface that forms a bottom cooking surface of the appliance. The top housing has a bottom surface that forms a top cooking surface of the appliance. The top housing is movably attached to the bottom housing. The top housing is moveable between a closed position and an open position. Ring assembly 200 is positioned between the top and bottom cooking surfaces when the top housing is in its closed position.

Ring assembly 200 of FIG. 14 is similar to the ring assembly of FIGS. 1-9. However, the ring assembly of FIG. 14 has a food item supporting/elevating mechanism 214 that selectively supports a first food item above a second food item when the second food item is in the top cooking cavity. Ring assembly 200 comprises top ring 202, bottom ring 206, and center cooking plate 204. Top ring 202 and bottom ring 206 are together selectively movably attached to the bottom housing (not illustrated) of the cooking appliance. This configuration enables top ring 202 to be movable between a closed position and an open position. Similarly, bottom ring 206 is movable between a closed position and an open position. The top ring may be moveable independently of the top housing and independently of the bottom ring, and the bottom ring may be movable independently of the top housing and independently of the top ring.

Center cooking plate 204 is pivotably movable between a closed position and an open position. In the closed position of center cooking plate 204, when top ring 202 and bottom ring 206 are also in their respective closed positions, center cooking plate 204 is positioned between the top and bottom rings 202, 206. The open position of center cooking plate 204 is where center cooking plate 204 does not entirely overlap the circumference of at least top ring 202 or bottom ring 206 or where some or all of center cooking plate 204 is not positioned between the top and bottom rings 202, 206. Center cooking plate 204 is movable between its open position and its closed position while the top and bottom rings are in their respective closed positions. Center cooking plate 204 is pivotably attached to top ring 202 at a pivot point (not visible in FIG. 14). It is possible to pivot center cooking plate 204 about the pivot point to center cooking plate's closed position without displacing top or bottom rings 202, 206

Center cooking plate 204 defines top and bottom cooking cavities when top ring 202, bottom ring 206, and center cooking plate 204 are all in their respective closed positions, as illustrated in FIG. 14. The top cooking cavity is formed by the top cooking surface (not illustrated) of the appliance, top ring 202, and center cooking plate 204 when the top housing, top ring 202, and center cooking plate 204 are in their respective closed positions. The bottom cooking cavity is formed by the bottom cooking surface (not illustrated) of the appliance, bottom ring 206, and center cooking plate 204 when the top housing, bottom ring 204, and center cooking plate 204 are in their respective closed positions.

Food item supporting/elevating mechanism 214 selectively supports a first food item (such as a bread item) above a second food item (such as an egg) when the second food item is in the top cooking cavity. Food item supporting/elevating mechanism 214 comprises two elongated parallel arms 216 slidably protruding through corresponding ones of openings 218 defined in the wall of top ring 202. A handle 220 is affixed to arms 216 to enable a user to slide arms 216 between a closed position in which the distal ends of arms 216 (i.e., the ends opposite handle 220) contact or nearly contact the opposing side wall of top ring 202 and an open position in which the distal ends of arms 216 are at or near openings 218 (in an embodiment in which food item supporting/elevating mechanism 214 is not removable from ring assembly 200) or are removed entirely from openings 218 (in an embodiment in which food item supporting/elevating mechanism 214 is selectively removable from ring assembly 200). In an embodiment in which food item supporting/elevating mechanism 214 is not removable from ring assembly 200, a retention mechanism may be affixed to one or both distal ends of arms 216 to prevent food item supporting/elevating mechanism 214 from being removed from ring assembly 200. Food item supporting/elevating mechanism 214 is illustrated in FIG. 14 having two arms 216 each having a circular cross-sectional shape. In alternative embodiments of the disclosure, the food item supporting/elevating mechanism may have many different structures and shapes. For example, the food item supporting/elevating mechanism may comprise more or fewer than two arms, and the arms may have a different cross-sectional shape (e.g., square). In another example, the food item supporting/elevating mechanism may comprise a single, elongated planar arm having a rectangular cross-sectional shape.

Ring assembly 200 further comprises handles 208 and 210 affixed, respectively, to each of top ring 202 and bottom ring 206 to enable a user to independently move the top and bottom rings. Ring assembly 200 further comprises handle 212 affixed center cooking plate 204 to enable a user to pivotably move center cooking plate 204.

The operation of an appliance with ring assembly 200 is similar to that of the appliance of FIGS. 1-9. A bottom layer of a food item is placed into bottom ring 206 such that the bottom layer sits on the bottom cooking surface. Such a bottom layer may be, for example, one half of an English muffin. One or more additional layers may be placed on top of the bottom food layer. After the desired layers are placed into the bottom ring 206, top ring 202 is lowered into its closed position and center cooking plate 204 is pivoted into its closed position (if not already in that position). Additional food layers may then be placed into top ring 202 such that the first additional food layer (such as an uncooked egg) sits directly on center cooking plate 204. One or more additional layers of food items may then be placed on top of the food layer that sits directly on center cooking plate 204. Food item supporting/elevating mechanism 214 is moved into its closed position, and the top layer (i.e., the last layer to be placed into the top ring, which may be, for example, the other half of the English muffin) is placed onto arms 216.

After all of the desired layers are placed into top ring 202, the top housing is lowered into its closed position. The appliance is maintained in this fully closed position for a period of time to either toast the top or bottom layers or, if necessary, to enable any internal food item to be heated/cooked. After sufficient time has elapsed, center cooking plate 204 is pivoted to its open position such that center cooking plate 204 is no longer separating the top cooking cavity from the bottom cooking cavity, thereby causing the layers in the top cooking cavity to separate from center cooking plate 204 such that they stack onto any food items in the bottom cooking cavity. Food item supporting/elevating mechanism 214 is moved into its open position such that the top food layer drops onto the food layer immediately below. Accordingly, the top food layers are assembled onto the food layers positioned in the bottom cooking cavity. Thus, a fully cooked sandwich is now assembled. Top housing, top ring 202, and bottom ring 206 are now raised into their respective open/upper positions, such that the assembled sandwich may be readily removed from the appliance.

Referring now to FIGS. 15A-B, isometric views of a ring assembly of a sandwich making appliance are illustrated, in accordance with alternative embodiments of the present disclosure. The ring assembly 240 of FIGS. 15A-B is shown removed from its sandwich making appliance for clarity. FIG. 15A illustrates ring assembly 240 in a disassembled state, while FIG. 15B illustrates ring assembly 240 in an assembled state. The sandwich making appliance that would comprise ring assembly 240 of FIGS. 15A-B is similar to the sandwich making appliance of FIGS. 1-9 in that it comprises a bottom housing and a top housing. The bottom housing has a top surface that forms a bottom cooking surface of the appliance. The top housing has a bottom surface that forms a top cooking surface of the appliance. The top housing is movably attached to the bottom housing. The top housing is moveable between a closed position and an open position. Ring assembly 240 is positioned between the top and bottom cooking surfaces when the top housing is in its closed position.

Ring assembly 240 of FIGS. 15A-B is similar to the ring assembly of FIGS. 1-9. However, the ring assembly 240 of FIGS. 15A-B has a food item supporting/elevating mechanism that selectively supports a first food item above a second food item when the second food item is in the top cooking cavity. Ring assembly 240 comprises top ring 242, bottom ring 244, and center cooking plate 246. Top ring 242 and bottom ring 244 are together selectively movably attached to the bottom housing (not illustrated) of the cooking appliance. This configuration enables top ring 242 to be movable between a closed position and an open position. Similarly, bottom ring 244 is movable between a closed position and an open position. The top ring may be moveable independently of the top housing and independently of the bottom ring, and the bottom ring may be movable independently of the top housing and independently of the top ring.

Center cooking plate 246 is pivotably movable between a closed position and an open position. In the closed position of center cooking plate 246, when top ring 242 and bottom ring 244 are also in their respective closed positions, center cooking plate 246 is positioned between the top and bottom rings 242, 244. The open position of center cooking plate 246 is where center cooking plate 246 does not entirely overlap the circumference of at least top ring 242 or bottom ring 244 or where some or all of center cooking plate 246 is not positioned between the top and bottom rings 242, 244. Center cooking plate 246 is movable between its open position and its closed position while the top and bottom rings are in their respective closed positions. Center cooking plate 246 is pivotably attached to top ring 242 at a pivot point (not visible in FIG. 15B, and only the center plate pivot point portion 247 is visible in FIG. 15A). It is possible to pivot center cooking plate 246 about the pivot point to center cooking plate's closed position without displacing top or bottom rings 242, 244.

Center cooking plate 246 defines top and bottom cooking cavities when top ring 242, bottom ring 244, and center cooking plate 246 are all in their respective closed positions, as illustrated in FIG. 15B. The top cooking cavity is formed by the top cooking surface (not illustrated) of the appliance, top ring 242, and center cooking plate 246 when the top housing, top ring 242, and center cooking plate 246 are in their respective closed positions. The bottom cooking cavity is formed by the bottom cooking surface (not illustrated) of the appliance, bottom ring 244, and center cooking plate 246 when the top housing, bottom ring 244, and center cooking plate 246 are in their respective closed positions.

Center cooking plate 246 comprises tab 248 that projects outward from the side edge of center cooking plate 246, such that tab 248 remains outside of the top and bottom rings 242, 244 when the center cooking plate is in its closed position (as illustrated in FIG. 15B). A generally horizontal slot 252 is defined in the top ring. The food item supporting/elevating mechanism comprises a support arm 250 affixed to tab 248. Support arm 250 projects upward from tab 248 and then generally horizontally over the center of center cooking plate 246. Support arm 250 projects through slot 252 when center cooking plate 246 is in its closed position (as illustrated in FIG. 15B). Support arm 250 does not project through slot 252 and is completely outside of the top and bottom rings 242, 244 when center cooking plate 246 is in its open position. As center cooking plate 246 moves from its closed position to its open position, support arm 250 is slidably removed from slot 252, thereby causing any food item supported by support arm 250 to drop onto the below item below.

Support arm 250 is illustrated in FIGS. 15A-B as having two arms joined at their distal ends by a connecting loop, and the arms have a circular cross-sectional shape. In alternative embodiments of the disclosure, the support arm may have many different structures and shapes. For example, the support arm may comprise more or fewer than two arms, and the arms may have a different cross-sectional shape (e.g., square). In another example, the support arm may comprise a single, elongated planar arm having a rectangular cross-sectional shape.

Ring assembly 240 may comprises handles (not illustrated) affixed, respectively, to each of top ring 242 and bottom ring 244 to enable a user to independently move the top and bottom rings. Tab 248 may function as a handle for center cooking plate 246 to enable a user to pivotably move center cooking plate 246, and may have a heat-resistant covering (not illustrated).

The operation of an appliance with ring assembly 240 is similar to that of the appliance of FIGS. 1-9. A bottom layer of a food item is placed into bottom ring 244 such that the bottom layer sits on the bottom cooking surface. Such a bottom layer may be, for example, one half of an English muffin. One or more additional layers may be placed on top of the bottom food layer. After the desired layers are placed into the bottom ring 244, top ring 242 is lowered into its closed position and center cooking plate 246 is pivoted into its closed position (if not already in that position). Additional food layers may then be placed into top ring 242 such that the first additional food layer (such as an uncooked egg) sits directly on center cooking plate 246. One or more additional layers of food items may then be placed on top of the food layer that sits directly on center cooking plate 246. The top food layer (i.e., the last layer to be placed into the top ring, which may be, for example, the other half of the English muffin) is placed onto support arm 250.

After all of the desired layers are placed into top ring 242, the top housing is lowered into its closed position. The appliance is maintained in this fully closed position for a period of time to either toast the top or bottom layers or, if necessary, to enable any internal food item to be heated/cooked. After sufficient time has elapsed, center cooking plate 246 is pivoted to its open position such that center cooking plate 246 is no longer separating the top cooking cavity from the bottom cooking cavity, thereby causing the layers in the top cooking cavity to separate from center cooking plate 246 such that they stack onto any food items in the bottom cooking cavity. Pivoting center cooking plate 246 to its open position also causes support arm 250 to exit top ring 242 such that the top food layer drops onto the food layer immediately below. Accordingly, the top food layers are assembled onto the food layers positioned in the bottom cooking cavity. Thus, a fully cooked sandwich is now assembled. Top housing, top ring 242, and bottom ring 244 are now raised into their respective open/upper positions, such that the assembled sandwich may be readily removed from the appliance.

Referring now to FIGS. 16A-B, isometric views of a ring assembly of a sandwich making appliance are illustrated, in accordance with alternative embodiments of the present disclosure. The ring assembly 300 of FIGS. 16A-B is shown removed from its sandwich making appliance for clarity. FIG. 16A illustrates ring assembly 300 in a disassembled state, while FIG. 16B illustrates ring assembly 300 in an assembled state. The sandwich making appliance that would comprise ring assembly 300 of FIGS. 16A-B is similar to the sandwich making appliance of FIGS. 1-9 in that it comprises a bottom housing and a top housing. The bottom housing has a top surface that forms a bottom cooking surface of the appliance. The top housing has a bottom surface that forms a top cooking surface of the appliance. The top housing is movably attached to the bottom housing. The top housing is moveable between a closed position and an open position. Ring assembly 300 is positioned between the top and bottom cooking surfaces when the top housing is in its closed position.

Ring assembly 300 of FIGS. 16A-B is similar to the ring assembly of FIGS. 1-9. However, the ring assembly 300 of FIGS. 16A-B has a food item supporting/elevating mechanism that selectively supports a first food item above a second food item when the second food item is in the top cooking cavity. Ring assembly 300 comprises top ring 302, bottom ring 304, and center cooking plate 306. Top ring 302 and bottom ring 304 are together selectively movably attached to the bottom housing (not illustrated) of the cooking appliance. This configuration enables top ring 302 to be movable between a closed position and an open position. Similarly, bottom ring 304 is movable between a closed position and an open position. The top ring may be moveable independently of the top housing and independently of the bottom ring, and the bottom ring may be movable independently of the top housing and independently of the top ring.

Center cooking plate 306 is pivotably movable between a closed position and an open position. In the closed position of center cooking plate 306, when top ring 302 and bottom ring 304 are also in their respective closed positions, center cooking plate 306 is positioned between the top and bottom rings 302, 304. The open position of center cooking plate 306 is where center cooking plate 306 does not entirely overlap the circumference of at least top ring 302 or bottom ring 304 or where some or all of center cooking plate 306 is not positioned between the top and bottom rings 302, 304. Center cooking plate 306 is movable between its open position and its closed position while the top and bottom rings are in their respective closed positions. Center cooking plate 306 is pivotably attached to top ring 302 at a pivot point (not visible in FIG. 16B, and only the center plate pivot point portion 307 is visible in FIG. 16A). It is possible to pivot center cooking plate 306 about the pivot point to center cooking plate's closed position without displacing top or bottom rings 302, 304.

Center cooking plate 306 defines top and bottom cooking cavities when top ring 302, bottom ring 304, and center cooking plate 306 are all in their respective closed positions, as illustrated in FIG. 16B. The top cooking cavity is formed by the top cooking surface (not illustrated) of the appliance, top ring 302, and center cooking plate 306 when the top housing, top ring 302, and center cooking plate 306 are in their respective closed positions. The bottom cooking cavity is formed by the bottom cooking surface (not illustrated) of the appliance, bottom ring 304, and center cooking plate 306 when the top housing, bottom ring 304, and center cooking plate 306 are in their respective closed positions.

A generally vertical slot 310 is defined in top ring 302, extending from the bottom edge of the top ring toward but not reaching the top edge of top ring 302. The food item supporting/elevating mechanism a curved, generally vertical ridge 308 projecting upward from a top surface of the center cooking ring. Ridge 308 extends from the edge of center cooking plate 306 past a midpoint of center cooking plate 306. Ridge 308 cooperatively passes through slot 310 as center cooking plate 306 moves between its open and closed positions. When center cooking plate 306 is in its closed position, as illustrated in FIG. 16B, ridge 308 is mostly or entirely within top ring 302 and is able to support a food item above another food item that is sitting on center cooking plate 306. As center cooking plate 306 is pivoted from the closed position to the open position, ridge 308 slidably exits top ring 302 through slot 310, thereby causing any food item supported by ridge 308 to drop onto the below item below.

Ridge 308 is illustrated in FIGS. 16A-B as having a rectangular cross-sectional shape and slot 310 has a corresponding rectangular shape. In alternative embodiments of the disclosure, the ridge and slot may have many different structures and shapes. For example, the ridge may have a pointed top edge such that the ridge has a triangular cross-sectional shape, with the slot having a corresponding triangular shape. In another example, the ridge may have a large, flat top edge such that is has a "T" cross-sectional shape, with the slot having a corresponding "T" shape.

Ring assembly 300 comprises handles 312, 314 affixed, respectively, to each of top ring 302 and bottom ring 304 to enable a user to independently move the top and bottom rings. Handle 316 is affixed to center cooking plate 306 to enable a user to pivotably move center cooking plate 306.

The operation of an appliance with ring assembly 300 is similar to that of the appliance of FIGS. 1-9. A bottom layer of a food item is placed into bottom ring 304 such that the bottom layer sits on the bottom cooking surface. Such a bottom layer may be, for example, one half of an English muffin. One or more additional layers may be placed on top of the bottom food layer. After the desired layers are placed into the bottom ring 304, top ring 302 is lowered into its closed position and center cooking plate 306 is pivoted into its closed position (if not already in that position). Additional food layers may then be placed into top ring 302 such that the first additional food layer (such as an uncooked egg) sits directly on center cooking plate 306. One or more additional layers of food items may then be placed on top of the food layer that sits directly on center cooking plate 306. The top food layer (i.e., the last layer to be placed into the top ring, which may be, for example, the other half of the English muffin) is placed onto ridge 308.

After all of the desired layers are placed into top ring 302, the top housing is lowered into its closed position. The appliance is maintained in this fully closed position for a period of time to either toast the top or bottom layers or, if necessary, to enable any internal food item to be heated/cooked. After sufficient time has elapsed, center cooking plate 306 is pivoted to its open position such that center cooking plate 306 is no longer separating the top cooking cavity from the bottom cooking cavity, thereby causing the layers in the top cooking cavity to separate from center cooking plate 306 such that they stack onto any food items in the bottom cooking cavity.

Pivoting center cooking plate 306 to its open position also causes ridge 308 to exit top ring 302 such that the top food layer drops onto the food layer immediately below. Accordingly, the top food layers are assembled onto the food layers positioned in the bottom cooking cavity. Thus, a fully cooked sandwich is now assembled. Top housing, top ring 302, and bottom ring 304 are now raised into their respective open/upper positions, such that the assembled sandwich may be readily removed from the appliance.

Referring now to FIG. 17, an isometric view of a sandwich making appliance is illustrated in accordance with alternative embodiments of the present disclosure. Sandwich making appliance 280 of FIG. 17 may use any suitable ring assembly, such as any of the ring assemblies of FIGS. 1-12. The ring assembly is omitted from FIG. 17 for clarity. Sandwich making appliance 280 comprises bottom housing 284 and top housing 282. Bottom housing 284 has top surface 288 that forms a bottom cooking surface of the appliance. Top housing 282 has bottom surface 286 that forms a top cooking surface of the appliance. Top housing 282 is movably attached to bottom housing 284. Top housing 282 is moveable between a closed position (not illustrated) and an open position (illustrated in FIG. 17). The ring assembly is positioned between the top and bottom cooking surfaces when the top housing is in its closed position. Sandwich making appliance 280 comprises support arm 290 that is pivotably affixed to the top housing at pivot point 292. Support arm 290 selectively supports a food item above another food item that is sitting on the center cooking plate.

The operation of appliance 280 of FIG. 17 is similar to that of the appliance of FIGS. 1-9. The main difference is that the top food item (typically a bread item) is placed between support arm 290 and top cooking surface 286 at any time prior to cooking, such that the top food item is retained by support arm 290. The other food items are placed in the ring assembly as described above in relation to FIGS. 1-9. Top housing 282 is lowered into its closed position. The appliance is maintained in this fully closed position for a period of time to either toast the top or bottom layers or, if necessary, to enable any internal food item to be heated/cooked. After sufficient time has elapsed, the center cooking plate is pivoted to its open position such that the center cooking plate is no longer separating the top cooking cavity from the bottom cooking cavity, thereby causing the layers in the top cooking cavity to separate from the center cooking plate such that they stack onto any food items in the bottom cooking cavity. A fully cooked sandwich is now assembled, except for the top food item. Top housing 282, the top ring, and the bottom ring are now raised into their respective open/upper positions. The top food item is removed from support arm 290 (which may require rotating support arm 290) and may be placed on top of the other stacked food items. The assembled sandwich may then be readily removed from the appliance.

Referring now to FIGS. 18A-B, isometric views of a sandwich making appliance are illustrated in accordance with alternative embodiments of the present disclosure. Sandwich making appliance 360 comprises bottom housing 364 and top housing 362. Bottom housing 364 has top surface 372 that forms a bottom cooking surface of the appliance. Top housing 362 has bottom surface 374 that forms a top cooking surface of the appliance. Top housing 362 is movably attached to bottom housing 364. Top housing 362 is moveable between a closed position (not illustrated) and an open position (illustrated in FIGS. 18A-B). A ring assembly is positioned between the top and bottom cooking surfaces when the top housing is in its closed position. Sandwich making appliance 360 of FIGS. 18A-B may use any suitable ring assembly, such as any of the ring assemblies of FIGS. 1-12. The ring assembly illustrated in FIGS. 18A-B is identical to and functions the same as the ring assembly of FIGS. 1-9. The ring assembly of FIGS. 18A-B comprises top ring 366, bottom ring 370, and center cooking plate 368.

Top housing 362 comprises ring 376 that forms a top housing cavity for holding a top food item. Sandwich making appliance 360 comprises support arm 380 that is pivotably affixed to top housing 362. Support arm 380 is selectively movable between a first position (FIG. 18B) at least partly blocking the opening of the top housing cavity to retain a food item within ring 376 and a second position (FIG. 18A) not blocking the opening of the top housing cavity such that the food item is not retained within ring 376. As such, support arm 380 selectively retains a food item with ring 376 and above another food item that is sitting on the center cooking plate.

The operation of appliance 360 of FIGS. 18A-B is similar to that of the appliance of FIGS. 1-9. The main difference is that the top food item (typically a bread item) is placed within ring 376 at any time prior to cooking, and then support arm 380 is pivoted into the position shown in FIG. 18B so that top the food item is retained within ring 376. The other food items are placed in the ring assembly as described above in relation to FIGS. 1-9. Top housing 362 is lowered into its closed position. The appliance is maintained in this fully closed position for a period of time to either toast the top or bottom layers or, if necessary, to enable any internal food item to be heated/cooked. After sufficient time has elapsed, the center cooking plate is pivoted to its open position such that the center cooking plate is no longer separating the top cooking cavity from the bottom cooking cavity, thereby causing the layers in the top cooking cavity to separate from the center cooking plate such that they stack onto any food items in the bottom cooking cavity. Support arm 380 is pivoted into the position shown in FIG. 18A, such that the top food item drops onto the item below. A fully cooked sandwich is now assembled, and may then be readily removed from the appliance.

Referring now to FIGS. 19A-B, isometric views of a sandwich making appliance are illustrated in accordance with alternative embodiments of the present disclosure. FIG. 19C illustrates a component of the sandwich making appliance of FIGS. 19A-B. Sandwich making appliance 400 comprises bottom housing 404 and top housing 402. Bottom housing 404 has top surface 412 that forms a bottom cooking surface of the appliance. Top housing 402 has bottom surface 414 that forms a top cooking surface of the appliance. Top housing 402 is movably attached to bottom housing 404. Top housing 402 is moveable between a closed position (not illustrated) and an open position (illustrated in FIGS. 19A-B). A ring assembly is positioned between the top and bottom cooking surfaces when the top housing is in its closed position. Sandwich making appliance 400 of FIGS. 19A-B may use any suitable ring assembly, such as any of the ring assemblies of FIGS. 1-12. The ring assembly illustrated in FIGS. 19A-B is identical to and functions the same as the ring assembly of FIGS. 1-9. The ring assembly of FIGS. 19A-B comprises top ring 406, bottom ring 410, and center cooking plate 408.

Top housing 402 comprises ring 416 that forms a top housing cavity for holding a top food item. Sandwich making appliance 400 comprises opposing movable jaws 418*a*, 418*b* positioned within the top housing cavity for retaining the first food item. First and second opposing movable jaws 418*a*, 418*b* are selectively movable between a first position (illustrated in FIG. 19A) for receiving or discharging the first food item and a second position (illustrated in FIG. 19B) for retaining the first food item with the top housing cavity. Each opposing movable jaw 418a, 418b protrudes through a curved slot 430 (only one is visible in FIGS. 19A-B) in bottom surface 414. Moving handle 420 of activation lever 424 moves the jaws between the two positions. Activation lever 424 moves within slot 422 in top housing 402. FIG. 19C illustrates one possible structure for selectively moving opposing movable jaws 418a, 418b. As seen in FIG. 19C, first lever arm 426 is pivotably affixed at one end to first opposing movable jaw 418a and pivotably affixed at the other end to activation lever 424. Similarly, second lever arm 428 is pivotably affixed at one end to second opposing movable jaw 418b and pivotably affixed at the other end to activation lever 424. Moving activation lever 424 to the right (as viewed in FIG. 19C), such as by grasping handle 420, causes first and second lever arms 426, 428 to move apart, which in turn causes first and second opposing movable jaws 418a, 418b to move apart. Conversely, moving activation lever 424 to the left (as viewed in FIG. 19C), such as by grasping handle 420, causes first and second lever arms 426, 428 to move toward each other, which in turn causes first and second opposing movable jaws 418a, 418b to move toward each other.

The operation of appliance 400 of FIGS. 19A-C is similar to that of the appliance of FIGS. 1-9. The main difference is that the top food item (typically a bread item) is placed within ring 416 while opposing movable jaws 418a, 418b are apart. Handle 420 is then moved to move opposing movable jaws 418a, 418b closer together so that top the food item is retained within ring 416. The other food items are placed in the ring assembly as described above in relation to FIGS. 1-9. Top housing 402 is lowered into its closed position. The appliance is maintained in this fully closed position for a period of time to either toast the top or bottom layers or, if necessary, to enable any internal food item to be heated/cooked. After sufficient time has elapsed, the center cooking plate is pivoted to its open position such that the center cooking plate is no longer separating the top cooking cavity from the bottom cooking cavity, thereby causing the layers in the top cooking cavity to separate from the center cooking plate such that they stack onto any food items in the bottom cooking cavity. Handle 420 is moved to move opposing movable jaws 418a, 418b apart such that the top food item drops onto the item below. A fully cooked sandwich is now assembled, and may then be readily removed from the appliance.

Referring now to FIGS. 20A-B, isometric views of a sandwich making appliance are illustrated in accordance with alternative embodiments of the present disclosure. The sandwich making appliance 440 of FIGS. 20A-B comprises a bottom housing 444 and a top housing 442. Bottom housing 444 has a top surface 446 that forms a bottom cooking surface of the appliance. Top housing 442 has a bottom surface 448 that forms a top cooking surface of the appliance. Top housing 442 is movably attached to bottom housing 444. Top housing 442 is moveable between a closed position (illustrated in FIG. 20B) and an open position (illustrated in FIG. 20A). Ring assembly 460 is positioned between the top and bottom cooking surfaces when the top housing is in its closed position.

Ring assembly 460 of FIGS. 20A-B comprises top ring 450, bottom ring 454, and center cooking plate 452. Top ring 450 and bottom ring 454 are attached to hinge 456 which comprises both a horizontal hinge component and a vertical hinge pin. Top ring 450 and bottom ring 454 are attached to the horizontal hinge component of hinge 456, such that top ring 450 and bottom ring 454 are each selectively pivotably movable up and down between a vertically closed position (illustrated in FIG. 20A) and a vertically open position (not illustrated). Top ring 450 and bottom ring 454 selectively pivotably movable up and down independent of each other.

The horizontal hinge component of hinge 456 is attached to the vertical hinge component of hinge 456, such that top ring 450 and bottom ring 454 are each selectively pivotably movable side-to-side between a horizontally closed position (illustrated in FIG. 20A) and a horizontally open position (illustrated in FIG. 20B).

Center cooking plate 452 is attached to hinge 458 such that center cooking plate 452 is selectively pivotably movable up and down between a vertically closed position (illustrated in FIGS. 20A-B) and a vertically open position (not illustrated). Center cooking plate 452 is not movable side-to-side in the illustrated embodiment.

Top and bottom cooking cavities are formed when top ring 450 and bottom ring 454 are in their respective horizontally and vertically closed positions, and when center cooking plate 452 is in its vertically closed position. The top cooking cavity is formed by top cooking surface 448, top ring 450, and center cooking plate 452. The bottom cooking cavity is formed by bottom cooking surface 446, bottom ring 454, and center cooking plate 452.

Although not illustrated, handles may be affixed to each of top ring 450, bottom ring 454, and center cooking plate 452 to enable a user to independently move these components.

The operation of appliance 440 with ring assembly 460 is similar to that of the appliance of FIGS. 1-9 except for the steps to remove the cooked sandwich. A bottom layer of a food item is placed into bottom ring 454 (when bottom ring 454 is in its horizontally and vertically closed position) such that the bottom layer sits on the bottom cooking surface. Such a bottom layer may be, for example, one half of an English muffin. One or more additional layers may be placed on top of the bottom food layer. After the desired layers are placed into the bottom ring 454, center cooking plate 452 is lowered into its closed position and top ring 450 is positioned in its horizontally and vertically closed position. Additional food layers may then be placed into top ring 450 such that the first additional food layer (such as an uncooked egg) sits directly on center cooking plate 452. One or more additional layers of food items may then be placed on top of the food layer that sits directly on center cooking plate 452. The top layer (i.e., the last layer to be placed into the top ring) may be, for example, the other half of the English muffin.

After all of the desired layers are placed into top ring 450, the top housing is lowered into its closed position. The appliance is maintained in this fully closed position for a period of time to either toast the top or bottom layers or, if necessary, to enable any internal food item to be heated/cooked. After sufficient time has elapsed, top ring 450 and bottom ring 454 are pivoted into their respective horizontally open positions (illustrated in FIG. 20B). Pivoting top ring 450 and bottom ring 454 into their respective horizontally open positions causes the layers in the top cooking cavity to separate from center cooking plate 452 and causes all food layers to be pulled out of the appliance. When top ring 450 and bottom ring 454 are in their respective horizontally open positions, the layers fall out of the top and bottom rings and onto a surface (e.g., a plate) below the top and bottom rings, resulting in a fully cooked and assembled sandwich on the surface.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. An appliance for cooking a food item, the appliance comprising:
   a bottom housing having a top surface, the top surface forming a bottom cooking surface of the appliance;
   a top housing having a bottom surface, the bottom surface forming a top cooking surface of the appliance, the top housing being movably attached to the bottom housing, the top housing moveable between a closed position and an open position;
   a ring assembly positioned between the top and bottom cooking surfaces when the top housing is in its closed position, the ring assembly comprising a top ring, a bottom ring, and a center cooking plate selectively therebetween, the center cooking plate dividing a space defined by the ring assembly into top and bottom cooking cavities; and
   a food item support supporting a first food item above a second food item when the second food item is in the top cooking cavity, the food item support comprising one or more support arms selectively slidably insertable through a wall of the top ring.

2. The appliance of claim 1, wherein the a one or more support arms is movably affixed to the top housing.

3. The appliance of claim 2, wherein the one or more support arms is movably affixed to the top cooking surface of the top housing.

4. The appliance of claim 2, wherein the support arm is pivotably affixed to the top housing.

5. The appliance of claim 1, wherein the top housing further comprises a top housing cavity for holding the first food item; and wherein the food item support selectively supports a first food item and the one or more support arms are movably affixed to the top housing, the support arms being selectively movable between a first position at least partly blocking an opening of the top housing cavity to retain the first food item in the top housing cavity and a second position not blocking the opening of the top housing cavity such that the first food item is not retained in the top housing cavity.

6. An appliance for cooking a food item, the appliance comprising:
   a bottom housing having a top surface, the top surface forming a bottom cooking surface of the appliance;
   a top housing having a bottom surface, the bottom surface forming a top cooking surface of the appliance, the top housing being movably attached to the bottom housing, the top housing moveable between a closed position and an open position; and
   a ring assembly positioned between the top and bottom cooking surfaces when the top housing is in its closed position, the ring assembly comprising a top ring, a bottom ring, and a center cooking plate, the center cooking plate being adapted to be removably inserted between the top ring and the bottom ring such that a space defined by the ring assembly is divided into top and bottom cooking cavities when the center cooking plate is inserted between the top ring and the bottom ring;
   wherein the top cooking cavity is formed by the top cooking surface, the top ring, and the center cooking plate when the top housing is in its closed position and when the center cooking plate is inserted between the top ring and the bottom ring; and
   wherein the bottom cooking cavity is formed by the bottom cooking surface, the bottom ring, and the center cooking plate when the top housing is in its closed position and when the center cooking plate is inserted between the top ring and the bottom ring.

7. The appliance of claim 6, wherein the ring assembly is selectively movably attached to the bottom housing to enable the ring assembly to move between a closed position and an open position.

8. The appliance of claim 6, wherein the top ring is selectively movably attached to the bottom housing to enable the top ring to move between a closed position and an open position;
   wherein the bottom ring is selectively movably attached to the bottom housing to enable the bottom ring to move between a closed position and an open position;
   wherein top ring is adapted to move independently of the top housing and independently of the bottom ring; and
   wherein the bottom ring is adapted to move independently of the top housing and independently of the top ring.

9. The appliance of claim 8, wherein the center cooking plate is adapted to be removably inserted between the top ring and the bottom ring while the top and bottom rings are in their respective closed positions.

10. The appliance of claim 9, wherein the ring assembly further comprises at least one spacer element to maintain a desired spacing between the top and bottom rings while the top and bottom rings are in their respective closed positions.

11. The appliance of claim 9, wherein the ring assembly further comprises one or more stop guides, the center cooking plate engaging the one or more stop guides when the center cooking plate is inserted between the top ring and the bottom ring such that the center cooking plate fully overlaps a bottom open end of the top ring and a top open end of the bottom ring.

12. An appliance for cooking a food item, the appliance comprising:
   a bottom housing having a top surface, the top surface forming a bottom cooking surface of the appliance;
   a top housing having a bottom surface, the bottom surface forming a top cooking surface of the appliance, the top housing being movably attached to the bottom housing, the top housing moveable between a closed position and an open position; and
   a ring assembly positioned between the top and bottom cooking surfaces when the top housing is in its closed position, the ring assembly comprising a top ring, a bottom ring, and a center cooking plate therebetween, the center cooking plate dividing a space defined by the ring assembly into top and bottom cooking cavities;

wherein the top ring, the bottom ring, and the center cooking plate each comprise left and right portions;

wherein the left portions of the top ring, the bottom ring, and the center cooking plate together comprise a left ring assembly portion;

wherein the right portions of the top ring, the bottom ring, and the center cooking plate together comprise a right ring assembly portion;

wherein the left ring assembly portion and the right ring assembly portion are movable in relation to each other and to the top and bottom housings;

wherein the top cooking cavity is formed by the top cooking surface, the top ring, and the center cooking plate when the top housing is in its closed position and when the left and right ring assembly portions are positioned abutting each other; and wherein the bottom cooking cavity is formed by the bottom cooking surface, the bottom ring, and the center cooking plate when the top housing is in its closed position and when the left and right ring assembly portions are positioned abutting each other.

13. The appliance of claim 12, wherein the left ring assembly portion comprises a unitary left ring assembly portion such that the left portions of the top ring, the bottom ring, and the center cooking plate are unitary and are movable only in unison; and wherein the right ring assembly portion comprises a unitary right ring assembly portion such that the right portions of the top ring, the bottom ring, and the center cooking plate are unitary and are movable only in unison.

14. The appliance of claim 13, wherein the unitary left ring assembly portion and the unitary right ring assembly portion are pivotably affixed to each other.

15. The appliance of claim 13, wherein the unitary left ring assembly portion and the unitary right ring assembly portion are each affixed to a rack and pinion mechanism such that the unitary left ring assembly portion and the unitary right ring assembly portion are linearly movable toward each other and away from each other.

16. An appliance for cooking a food item, the appliance comprising:

a bottom housing having a top surface, the top surface forming a bottom cooking surface of the appliance;

a top housing having a bottom surface, the bottom surface forming a top cooking surface of the appliance, the top housing being movably attached to the bottom housing, the top housing moveable between a closed position and an open position; and a ring assembly positioned between the top and bottom cooking surfaces when the top housing is in its closed position, the ring assembly comprising a top ring, a bottom ring, and a center cooking plate, the center cooking plate comprising left and right portions that are movable in relation to each other;

wherein the top cooking cavity is formed by the top cooking surface, the top ring, and the center cooking plate when the top housing is in its closed position and the left and right center cooking plate portions are positioned abutting each other; and wherein the bottom cooking cavity is formed by the bottom cooking surface, the bottom ring, and the center cooking plate when the top housing is in its closed position and the left and right center cooking plate portions are positioned abutting each other.

17. The appliance of claim 16, wherein the left and right center cooking plate portions are pivotably movable in relation to each other.

18. The appliance of claim 16, wherein the left and right center cooking plate portions are movable between a closed position in which the left and right center cook plate portions abut each other and an open position in which the left and right center cooking plate portions are a maximum distance apart.

* * * * *